(12) United States Patent
Miyamoto et al.

(10) Patent No.: US 6,436,504 B2
(45) Date of Patent: Aug. 20, 2002

(54) INFORMATION RECORDING MEDIUM

(75) Inventors: Makoto Miyamoto, Ome; Akemi Hirotsune, Higashimurayama; Keikichi Andoo, Musashino; Tetsuya Nishida, Odawara; Motoyasu Terao, Tokyo; Junko Ushiyama, Kodaira; Yumiko Anzai, Ome, all of (JP)

(73) Assignees: Hitachi, Ltd., Tokoy; Hitachi Maxell, Ltd., Osaka, both of (JP)

( * ) Notice: Subject to any disclaimer, the term of this patent is extended or adjusted under 35 U.S.C. 154(b) by 0 days.

(21) Appl. No.: 09/832,137

(22) Filed: Apr. 11, 2001

Related U.S. Application Data

(63) Continuation of application No. 09/380,302, filed on Jul. 30, 1999, now Pat. No. 6,231,945.

(30) Foreign Application Priority Data

Sep. 9, 1997  (JP) .............................................. 9-243670

(51) Int. Cl.$^7$ ................................................. B32B 3/02
(52) U.S. Cl. ................... 428/64.1; 428/64.5; 428/64.6; 430/270.13
(58) Field of Search .............................. 425/64.1, 64.4, 425/64.5, 64.6, 457, 945; 369/283, 288; 430/270.13, 945

(56) References Cited

U.S. PATENT DOCUMENTS

| 6,064,642 A | 5/2000 | Okubo et al. |
| 6,132,932 A | 10/2000 | Miyamoto et al. |

FOREIGN PATENT DOCUMENTS

| JP | 6-4903 | 1/1994 |
| JP | 8-96411 | 4/1996 |
| JP | 8-115535 | 5/1996 |
| JP | 8-115536 | 5/1996 |
| JP | 8-190733 | 7/1996 |
| JP | 8-190734 | 7/1996 |

OTHER PUBLICATIONS

Yamada et al, Shingaku Giho MR92–71, CPM92–148, Dec. 1992, pp. 37–42.

Okada et al, Shingaku Giho MR93–53, CPM93–105, Dec. 1993, pp. 1–6.

*Primary Examiner*—Elizabeth Mulvaney
(74) *Attorney, Agent, or Firm*—Antonelli, Terry, Stout & Kraus, LLP

(57) ABSTRACT

An information recording medium having a substrate, a lower superficial layer formed on the substrate and having a thickness of not more than 25 nm, and a recording layer formed on the lower superficial layer. Information is recorded on the recording layer in accordance with a change of atomic arrangement caused by irradiation of light. The information recording medium includes and an absorption control layer formed on the recording layer.

20 Claims, 7 Drawing Sheets

INFORMATION RECORDING MEDIUM

CROSS REFERENCE TO RELATED APPLICATION

This is a continuation of U.S. application Ser. No. 09/380,302, filed Jul. 30, 1999, now U.S. Pat. No. 6,231,945, the subject matter of which is incorporated by reference herein.

TECHNICAL FIELD

The present invention relates to an information recording medium used for an optical disk.

BACKGROUND ART

Various principles are known for recording information in a thin film (recording film) by radiating a laser beam on it. Among them, a method utilizing the change of the atomic arrangement by the radiation of the laser beam such as the phase transition (also called the phase change) of the film material or the photo darkening is not substantially accompanied by the deformation of the thin film, and therefore has the advantage that an information recording medium of a two-side disk structure can be obtained by attaching two disk members directly to each other.

Generally, these information recording media are configured of a substrate, and a protective layer, a recording film of GeSbTe group, etc., a protective layer and a reflective layer formed on the substrate, and the reflectance is higher in crystal state than in amorphous state. Therefore, the absorption of a recording film is larger for amorphus. The recording mark portion in amorphous state is liable to increase in temperature more easily than the crystal. In the case where an overwrite operation is performed in this state, therefore, a newly recorded mark is increased excessively, thereby causing the reproduction signal to be distorted.

In order to prevent this inconvenience, an effort has been made to increase the absorption coefficient of the recording film in crystal state as compared with that of the recording film in amorphous state. For example, reference 1 "Yamada and three others, Shingaku Giho MR92–71, CPM92–148, December 1992, p.37" describes a structure formed with an Au reflective layer as thin as 10 nm to reverse the absorption coefficient.

Also, reference 2 "Okada and six others, Shingaku Giho MR93–53, CPM93–105, December 1993, p. 1" describes a structure in which Si of 65 nm is used for the reflective layer thereby to reverse the absorption coefficient.

In this specification, the term "phase change" is defined to include not only the phase change between crystal and amorphus but also between melting (change to liquid phase) and recrystallization and between crystal states.

DISCLOSURE OF INVENTION

In all the conventional information recording media used as a high-density rewritable information recording media of phase transition type using a mark edge recording, the erase characteristic is improved by reversing the absorption coefficient (the absorption coefficient of amorphus is lower than that of crystal). These media use a material with a thin reflective layer or a material of a reflective layer through which light is transmitted or has a structure allowing light to transmit therethrough. This method poses the problem that each absorption coefficient is smaller than that of the normal disk with the absorption coefficient not reversed, resulting in a small recording sensitivity. The laser used for recording having a wavelength shorter than about 680 nm is still low in output, and if the linear speed is increased for increasing the transfer rate, the recording sensitivity tends to deteriorate. Therefore a medium of high recording sensitivity is required.

Further, the use of a thin material of a low heat conductivity for the reflective layer poses the problem that heat generated at the time of recording is not easily diffused often causing an increased jitter after a multiplicity of overwrite cycles.

Accordingly, an object of the present invention is to solve these problems and to provide an information recording medium which has a superior recording/reproduction characteristic without increasing the jitter as compared with the prior art even after the overwrite cycle for high-density recording and reproduction.

Means for solving the problems will be described below.

(1) There is provided an information recording medium comprising an information recording thin film as a recording layer formed on a substrate for recording and/or reproducing information by the change in atomic arrangement caused by the radiation of light, and at least one protective layer, wherein the protective layer and the recording layer are formed in that order from the light incidence side, followed by being formed with at least one absorption control layer.

(2) There is provided an information recording medium as described in (1), characterized in that the thickness of the absorption control layer is in the range of not less than 10 nm but not more than 50 nm. The thickness of not less than 10 nm but not more than 40 nm is more preferable.

(3) There is provided an information recording medium as described in (1), wherein at least 95% of the total number of atoms of the absorption control layer is composed of a mixture or a compound of a dielectric material and a metal element.

(4) There is provided an information recording medium as described in (1), wherein the absorption control layer is made of a material having n (refractive index) of not less than 1.2 but not more than 6, and k (extinction coefficient) not less than 0.5 but not more than 3.3. If n is not less than 1.8 but not more than 5.5, and k is not less than 0.8 but not more than 3, it is more preferable.

(5) There is provided an information recording medium as described in (1), wherein the absorption control layer is made of a material having a melting point of not less than 600° C.

(6) There is provided an information recording medium as described in (1), characterized in that in the case where information is recorded on the recording film, the reflectance in amorphous state is lower than that in crystal state, the reflectance in amorphous state is lower than the reflectance in crystal state, and the mark size with the shortest mark recorded on a material in amorphous state is equal to or smaller than the mark size with the shortest mark recorded on a material in crystal state under the same conditions.

(7) There is provided an information recording medium as described in (1), wherein at least a heat diffusion layer is formed between the substrate and the protective layer.

(8) There is provided an information recording medium comprising an information recording thin film as a recording layer formed on a substrate for recording and/or reproducing information by the change in atomic arrangement caused by the radiation of light, at least a protective layer, at least a heat diffusion layer and at least a heat diffusion layer, characterized in that the heat diffusion layer, the protective layer and the recording layer are formed in that order from the light incidence side, followed by being formed with at least one reflective layer.

(9) There is provided an information recording medium as described in any one of (7) and (8), characterized in that at least 90% of the total number of atoms of the heat diffusion layer is composed of Al—O.

(10) There is provided an information recording medium as described in any one of (7) and (8), characterized in that the heat diffusion layer has a layer in which at least 90% of the total number of atoms has a composition similar to any one of $(SiO_2)$, $(Al_2O_3)$, $(Ta_2O_5)$, $(Al_2O_3)$—$(SiO_2)$, $(Ta_2O_5)$—$(SiO_2)$, $(Al_2O_3)$—$(Ta_2O_5)$ and $(Al_2O_3)$—$(SiO_2)$—$(Ta_2O_5)$ or a mixture composition thereof.

(11) There is provided an information recording medium as described in any one of (7) to (8), wherein the heat diffusion layer has a layer in which at least 90% of the total number of atoms has a composition similar to any one of Be—O, B—N, Si—C and Mg—O or a mixture composition thereof.

(12) There is provided an information recording medium as described in (1), characterized by having a structure wherein a reflection layer composed of at least one layer of a Cu alloy, an Al alloy and an Au alloy is formed on the absorption control layer.

(13) There is provided an information recording medium as described in (1) or (8), characterized in that at least one surface protect layer is formed in the boundary of the recording film.

(14) There is provided an information recording medium as described in (1) or (8), characterized in that the recording film satisfies the relation

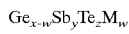

where $0.10 \leq x \leq 0.26$, $0.18 \leq y \leq 0.33$, $0.52 \leq z \leq 0.60$, $w \leq 0.06$ and $x+y+z=1$, and M is any one of Na, Mg, Al, P, S, Cl, L, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Ag, Cr, W, Mo, Pt, Co, Ni, Pd, Si, Au, Cu, V, Mn, Fe, Ti and Bi.

(15) There is provided an information recording medium as described in (1) or (8), characterized in that the protective layer is made of a layer containing at least 80 mol % of ZnS.

(16) In the case where the absorption control layer is made of Mo—$(SiO_2)$, the MO amount represents preferably not less than 42 mol % of all the components. The figure of not less than 61 mol % but not more than 90 mol % is more desirable.

The use of Cr, W, Fe, Sb, C, Zn, Mn, Ti, Co, Ge, Pt, Ni, Nb, Pd, Be or Ta as a material replacing Mo in the Mo—$(SiO_2)$ film of the absorption control layer has produced a similar result. Among these elements, Mo, Cr and W are more preferable as they have a high melting point. Also, Pd and Pt are not very reactive with other layers and the resulting increased possible number of overwrite cycles makes these elements more preferable. When Ni, Co or Ti is used, on the other hand, an inexpensive target can be used as compared with other materials and the total production cost can be reduced.

Materials which may be used in place of $SiO_2$ in the Mo—$(SiO_2)$ film used for the absorption control layer include oxides including SiO, $Al_2O_3$, BeO, $Bi_2O_3$, CoO, CaO, $Cr_2O_3$, $CeO_2$, $Cu_2°$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoC_2$, $MoO_3$, NbO, $NbO_2$, NiO, PbO, PdO, SnO, $SnO_2$, $Sc_2O_3$, SrO, $ThO_2$, $TiO_2$, $Ti_2O_3F$ TiO, $Ta_2O_5$, $TeO_2$, VO, $V_2O_3$, $VO_2$, $WO_2$, $WO_3$, $Y_2O_3$ and $ZrO_2$, nitrides including AlN, BN, CrN, $Cr_2N$, GeN, HfN, $Si_3N_4$, Al—Si—N group material (such as $AlSiN_2$), Si—N group material, Si—O—N group material, TaN, TiN and ZrN, sulfides including ZnS, $Sb_2S_3$, CdS, $In_2S_3$, $Ga_2S_3$, GeS, $SnS_2$, PbS, $Bi_2S_3$, SrS, MgS, CrS, CeS and $TaS_4$, selenides including $SnSe_2$, $Sb_2Se_3$, CdSe, ZnSe, $Tn_2Se_3$, $Ga_2Se_3$, GeSe, $GeSe_2$, SnSe, PbSe and $Bi_2Se_3$, fluorides including $CeF_3$, $MgF_2$, $CaF_2$, $TiF_3$, $NiF_3$, $FeF_2$ and $FeF_3$, Si, Ge, borides including $TiB_2$, $B_4C$, B, CrB, $HfB_2$, $TiB_2$ and WB, carbides including C, $Cr_3C_2$, $Cr_{23}C_6$, $Cr_7C_3$, $Fe_3C$, $MO_2C$, WC, $W_2C$, HfC, TaC and $CaC_2$, or a material having a composition similar to any of the materials described above or a mixture thereof.

Among these materials, the use of $SiO_2$, $Ta_2O_5$ or $Y_2O_3$—$ZrO_2$ makes it possible to use a target less expensive than when using other materials, and therefore can reduce the whole cost of production.

$Al_2O_3$ is high in heat conductivity. Therefore, a disk having a structure lacking the first reflective layer and/or the second reflective layer deteriorates the rewrite characteristic to lesser degree than when using other materials.

Also, in the case where the absorption control layer contains impurities elements not more than 5 atomic % of the components thereof, it can desirably reduce the deterioration of the rewrite characteristic. The content of not more than 2 atomic % is more preferable.

(17) A preferable material of the upper surface protect layer and the lower surface protect layer is $SiO_2$, $Al_2O_3$ or a mixture of $Al_2O_3$ and $SiO_2$. In the case where 70 mol % or more of $SiO_2$ or $Al_2O_3$ is contained, the crystallization rate is increased and at 18 m/s that is the rate about twice as high as in the absence of the surface protect layer, the erasure ratio reaches 25 dB or more.

The next preferable choice is $Ta_2O_5$ or a mixture between $Ta_2O_5$ and $SiO_2$ or $Al_2O_3$. The second next preferable choice is $ZrO_2$—$Y_2O_3$, $SiO_2$ or a mixture of $ZrO_2$—$Y_2O_3$ or $SiO_2$ with $Al_2O_3$ or $Ta_2O_5$. Among these materials, $Al_2O_3$ is more preferable as it can suppress the variations of the reflectance level to 5% or less and can reduce the jitter after a multiplicity of overwrite cycles. The materials CoO, $Cr_2O_3$ and NiO are also more preferable as a uniform crystal grain size is obtained at the time of initial crystallization and the jitter is increased to a lesser degree in the initial stage of overwrite cycle.

Also, nitrides such as AlN, BN, CrN, $Cr_2N$, GeN, HfN, $Si_3N_4$, Al—Sn—N group material (such as $AlSiN_2$), Si—N group material, Si—O—N group material, TaN, TiN and ZrN are more preferable as they increase the adhesion and deteriorate the information recording medium to a lesser degree under external shocks. A material of the recording film containing nitrogen or a material having a similar composition can also improve the adhesion.

In addition, oxides such as BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$ and $WO_3$ or carbides such as C, $Cr_3C_2$, $Cr_{23}C_6$, $Cr_7C_3$. $Fe_3C$, $Mo_2C$, WC, $W_2C$, HfC, TaC and $CaC_2$ or materials having a similar composition can also be used.

As another alternative, any mixture of these materials is usable.

The upper surface protect layer, the lower surface protect layer, and the replacement materials of the upper surface protect layer and the lower surface protect layer preferably represent 90% or more of the total number of atoms of the respective surface protect layer. In the case where impurities other than the materials described above reach ten atomic % or more, the possible number of overwrite cycles is reduced by 50% or more, or otherwise the rewrite characteristic is deteriorated.

In the absence of the upper surface protect layer, the reflective layer material diffuses into the recording film and the remanence increases, the reduction in the reflectance level after 100 thousand overwrite cycles can be suppressed to as small as 5% or less. A change in reflectance level causes the offset of the reproduction signal level, and adds the offset jitter for an increased jitter. Thus, the variation of the reflectance level is preferably as small as possible.

Further, for the modulation degree to be maintained at 43% or more, the figure of not more than 12 nm is preferable. For the figure of 5 nm or less, the modulation degree of 47% or more can be secured. A film of uniform thickness can be formed when the thickness is not less than about 2 nm. In the case where the thickness of the upper surface protect layer is 2 to 12 nm, therefore, the recording/reproduction characteristic is desirably improved.

In the absence of the lower surface protect layer, the protective layer material diffuses into the recording film for an increased remanence, so that the jitter increases beyond 6% after 100 thousand overwrite cycles. Further, for maintaining the modulation degree at 43% or more, the thickness is desirably maintained at 25 nm or less. The thickness of not less than 5 nm but not more than to 10 nm can secure the modulation degree of 47% or more. In view of the fact that a uniform film is formed for the thickness of about 2 nm or more, the recording/reproduction characteristic is desirably improved when the thickness of the lower surface protect layer is 2 to 25 nm. (18) Materials of the protective layer include any one of ZnS, Si—N group material, Si—O—N group material, oxides such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$ and MgO, nitrides such as TaN, AlN, BN, $Si_3N_4$, GeN, Al—Sn—N group material (such as $AlSiN_2$), sulfides such as ZnS, $Sb_2S_3$, CdS, $In_2S_3$, $Ga_2S_3$, GeS, $SnS_2$, PbS and $Bi_2S_3$, selenides such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$, fluorides such as $CeF_3$, $MgF_2$ and $CaF_2$, or Si, Ge, $TiB_2$, $B_4C$, B, C or materials having a similar composition to the materials described above. Also, a layer of a mixtures a multi-layer of these materials including ZnS—$SiO_2$ and ZnS—$Al_2O_3$ may be used. Among these materials, ZnS has a large n and can maintain a large modulation degree. In the case of a mixture containing 60 mol % or more of this material, the large n of ZnS and the superior chemical stability of the oxide have a combined effect. Further, ZnS has a large sputter rate, so that when ZnS represents 80 mol % or more, the film-producing time can be shortened. Other sulfides and selenides can also produce similar characteristics.

The element ratio in these compounds, i.e. the ratio between a metal element and oxygen element for oxides and the ratio between a metal element and a sulfide element for sulfides, for example, is preferably 2 to 3 or thereabouts for $Al_2O_3$, $Y_2O_3$ and $La_2O_3$, 1 to 2 or thereabouts for $SiO_2$, $ZrO_2$ and $GeO_2$, 2 to 5 or thereabouts for $Ta_2O_5$ and 1 to 1 or thereabouts for ZnS. Even a ratio departing from the ratios specified above can product a similar effect. In the case where the ratio is not an integral one described above, for example, the deviation of the ratio between Al and 0 in Al—O is preferably not more than ±10 atomic % in terms of Al amount from $Al_2O_3$, the deviation of the ratio between Si and I in Si—O is preferably not more than ±10 atomic % in terms of Si amount from $SiO_2$. In this way, the deviation of not more than 10 atomic % is desirable. A deviation of not less than 10 atomic % would change the optical characteristic and the modulation degree is reduced by 10% or more.

The protective layer and the replacement material of the protective material preferably represents at least 90% of the total number of atoms of the respective protective layer. In the case where impurities other than these materials increase to 10 atomic % or more, the possible number of overwrite cycles is reduced to one half or less or otherwise the rewrite characteristic is deteriorated.

The thickness of the protective layer is desirably 20 to 70 nm, which can increase the modulation degree for recording to as high as 43% or more, and more preferably, the thickness of the protective layer is 35 to 60 nm.

(19) The preferable materials of the heat diffusion layer are $Al_2O_3$, MgO, BeO, SiC, BN, $B_4C$ large in heat conductivity. Also, $Ta_2O_3$, $SiO_2$, $Al_2O_3$ and mixtures thereof have an inexpensive target and the production cost thereof is desirably low. On the other hand, $ThO_2$, $TiO_2$, AlN and TiN are desirable for their ease to form into a film.

Other preferable materials than those described above have a heat conductivity larger than the substrate material and an absorption coefficient k smaller than 0.5.

A large heat conductivity can suppress the damage to the substrate surface by heat at the time of recording, and therefore the jitter can be suppressed to a low level after 100 thousand overwrite cycles. Also, a small k can suppress the reduction of modulation degree to a small level.

The heat diffusion layer and the replacement materials of the heat diffusion layer are desirably not less than 90% of the total number of atoms of each protective layer. In the case where the impurities other than the materials described above reaches 10 atomic % or more, the possible number of overwrite cycles is reduced to one half or less or otherwise the rewrite characteristic is deteriorated.

The thickness of the heat diffusion layer is preferably 10 to 50 nm or more preferably 20 to 40 nm.

(20) The preferable material of the first reflective layer is Al—Cr, Al—Ti, Al—Ag or the like containing an Al alloy which can reduce the jitter to a low level at the time of overwrite operation.

The characteristic for a multiplicity of overwrite cycles has been found to be improved when the contents of the element other than Al in the Al alloy reaches the range of not less than 5 atomic % but not more than 30 atomic %. A similar characteristic is obtained also from the Al alloy other than those described above.

A layer may be used which is composed of any one of the element unit Au, Ag, Cu, Ni, Fe, Co, Cr, Ti, Pd, Pt, W, Ta, Mo, Sb, Bi, Dy, Cd, Mn, Mg or V or an alloy containing any one of these materials as a main component such as an Au alloy, Ag alloy, Cu alloy, Pd alloy, Pt alloy, Sb—Bi, SUS, Ni—Cr or alloys between these alloys. In this way, the first reflective layer is composed of a metal element, a metalloid element, an alloy or a mixture thereof.

Among these materials, such materials as Cu alloy, Al alloy or Au alloy having a large reflectance increases the modulation degree leading to a superior reproduction characteristic. A similar characteristic is exhibited by the Ag alloy. In this case, if the content of elements other than the main components is in the range of not less than 5 atomic % but not more than 30 atomic % like the Al alloy, the rewrite characteristic is improved further.

The preferable material of the second reflective layer is Al—Ti, Al—Ag, Al—Cu, Al—Cr or the like material containing an Al alloy as a main component. Al can also be used.

From this, it has been found that when the content of elements other than Al in the Al alloy is in the range of not less than 0.5 atomic % but not more than to 4 atomic %, the characteristic of a multiplicity of overwrite cycles and the bit error rate are improved, and the improvement is further enhanced in the case where the content is in the range of not less than one atomic % but not more than two atomic %. A similar characteristic is obtained for other Al alloys than described above.

Also, a layer may be used which is composed of the element unit such as Au, Ag, Cu, Ni, Fe, Co, Cr, Ti, Pd, Pt, W, Ta, Mo, Sb, Bi, Dy, Cd, Mn, Mg or V or an alloy containing any one of these elements as a main component such as an Au alloy, Ag alloy, Cu alloy, Pd alloy or Pt alloy or an alloy between these alloys. In this way, the second reflective layer is composed of a metal element, a metalloid element, an alloy or a mixture thereof.

Among these materials, those having a large heat conductivity such as Cu, Al, Au, Cu alloy, Al alloy and Au alloy have a superior rewrite characteristic as the disk can be cooled rapidly with ease. A similar characteristic is observed also for Ag and Ag alloy. In the case where the content of the elements other than Cu, Au and Ag making up the main components, like the Al alloy, is in the range of not less than 0.5 atomic % but not more than 4 atomic %, the characteristic of a multiplicity of overwrite cycles and the bit error rate are improved. This trend is further enhanced when the content is in the range of not less than one atomic % but not more than 2 atomic %.

Also, a study of the refractive index (n) and the extinction coefficient (k) of the materials of the first reflective layer and the second reflective layer described above shows that the jitter increase after 100 thousand overwrite cycles can be suppressed within 3% in the case where n of the first reflective layer is larger than n of the second reflective layer and k of the first reflective layer is smaller than k of the second reflective layer.

The materials of the first reflective layer and the second reflective layer desirably represent at least 95% of the total number of atoms of the respective reflective layer. In the case where impurities other than the materials described above reach 5 atomic % or more, the possible number of overwrite cycles is reduced to one half or otherwise the rewrite characteristic is deteriorated.

The thickness of the first reflective layer is desirably not less than 5 nm but not more than 100 nm. The thickness of the second reflective layer, on the other hand, is desirably not less than 30 nm but not more than 200 nm.

Examples of desirable combinations of the materials of the first reflective layer and the second reflective layer are an $Al_{94}Cr_6$ for the first reflective layer with $Al_{99}Ti_1$ for the second reflective layer, $Al_{90}Ti_{10}$ for the first reflective layer with $Al_{98}Ti_2$ for the second reflective layer, $Al_{75}Ti_{25}$ for the first reflective layer with $Al_{99}Ti_1$ for the second reflective layer, etc. in which case the first reflective layer and the second reflective layer contain the same main component element, and elements other than the main component element of Al are contained more in the second reflective layer than in the first reflective layer. A similar characteristic is obtained from the combinations of Al—Ti with Al—Ti, Al—Cr with Al—Cr or other combinations such as Al—Ag with Al—Cu in which the Al alloy is a main component. The Au alloy, Ag alloy, Cu alloy or a similar composition can improve the rewrite characteristic of a multiplicity of overwrite cycles.

(21) The substrate material may be a polycarbonate substrate with a tracking groove formed directly in the surface thereof, polyolefin, epoxy, acrylic resin, or a chemically reinforced glass having the surface thereof formed with an ultraviolet setting resin layer.

The substrate having a tracking groove is the one with the whole or part of the substrate surface having a groove at least $\lambda/10n'$ (n': refractive index of the substrate material) deep where $\lambda$ is the recording/reproduction wavelength. The groove may be formed either continuously over the whole periphery or segmented midway. It has been found that crosstalks are desirably reduced when the groove depth is about $\lambda/6n'$. Further, it has been found that although the yield for substrate production is deteriorated but the cross erase is reduced desirably when the groove is deeper than about $\lambda/3n'$.

Also, the groove may have different widths at different places. A substrate of sample servo format lacking a groove or of other tracking types or formats will do. A substrate having a format capable or recording and reproduction in both grooves and lands or a substrate having a format capable of recording and reproduction only in grooves or lands can also be used. The disk size is not limited to 12 cm, but other sizes including 13 cm, 3.5', 2.5', etc. are applicable with equal effect. The disk thickness is neither limited to 0.6 mm but other thickness such as 1.2 mm or 0.8 mm can be employed.

Two disk members including a first disk member and a second disk member are fabricated by exactly the same method, and are attached to each other by an adhesive with the second reflective layers thereof face to face. As an alternative, the second disk member may be replaced by a disk member of another configuration or a protective substrate. In the case where the disk member used for attachment or the protective substrate has a large transmittance in the ultraviolet wavelength area, the ultraviolet setting resin may be used for attaching the disk members. Other methods of attaching may also be used. A disk member of a structure having no second reflective layer may be attached with an adhesive layer formed on the topmost layer.

The first and second disk members described above are attached to each other with the second reflective layers thereof face to face through the adhesive layer. The error rate is reduced further by coating the ultraviolet setting resin about 10 $\mu$m thick on the second reflective layers of the first and second disk members beforehand and attaching the disk members to each other after the resin is set.

Instead of attaching the first and second disk members to each other, the ultraviolet setting resin may be coated to the thickness of about 10 $\mu$m on the second reflective layer of the first disk member. In the case of a disk member of a structure lacking the second reflective layer, the ultraviolet setting resin may be applied on the topmost layer.

(22) In addition to the structures described above, the structures of the disks 1 to 39 described below have a smaller remanence due to the absorption control layer and have the effect of reducing the jitter.

Disk 1: Substrate 1, heat diffusion layer 2, protective layer 3, lower surface protect layer 4, recording film 5, upper surface protect layer 6, absorption control layer 7, first reflective layer 8, adhesive layer 10

Disk 2: Substrate 1, heat diffusion layer 2, protective layer 3, lower surface protect layer 4, recording film 5, upper surface protect layer 6, absorption control layer 7, second reflective layer 9, adhesive layer 10

Disk 3: Substrate 1, heat diffusion layer 2, protective layer 3, lower surface protect layer 4, recording film 5, upper surface protect layer 6, absorption control layer 7, adhesive layer 10

Disk 4: Substrate 1, heat diffusion layer 2, protective layer 3, lower surface protect layer 4, recording film 5, absorption control layer 7, first reflective layer 8, second reflective layer 9, adhesive layer 10

Disk 5: Substrate 1, heat diffusion layer 2, protective layer 3, lower surface protect layer 4, recording film 5, absorption control layer 7, first reflective layer s, adhesive layer 10

Disk 6: Substrate 1, heat diffusion layer 2, protective layer 3, lower surface protect layer 4, recording film 5, absorption control layer 7, second reflective layer 9, adhesive layer 10

Disk 7: Substrate 1, heat diffusion layer 2, protective layer 3, lower surface protect layer 4, recording film 5, absorption control layer 7, adhesive layer 10

Disk 8: Substrate 1, heat diffusion layer 2, protective layer 3, recording film 5, upper surface protect layer 6, absorption control layer 7, first reflective layer 8, second reflective layer 9, adhesive layer 10

Disk 9: Substrate 1, heat diffusion layer 2, protective layer 3, recording film 5, upper surface protect layer 6, absorption control layer 7, first reflective layer 8, adhesive layer 10

Disk 10: Substrate 1, heat diffusion layer 2, protective layer 3, recording film 5, upper surface protect layer 6, absorption control layer 7, second reflective layer 9, adhesive layer 10

Disk 11: Substrate 1, heat diffusion layer 2, protective layer 3, recording film 5, upper surface protect layer 6, absorption control layer 7, adhesive layer 10

Disk 12: Substrate 1, heat diffusion layer 2, protective layer 3, recording film 5, absorption control layer 7, first reflective layer 8, second reflective layer 9, adhesive layer 10

Disk 13: Substrate 1, heat diffusion layer 2, protective layer 3, recording film 5, absorption control layer 7, first reflective layer 8, adhesive layer 10

Disk 14: Substrate 1, heat diffusion layer 2, protective layer 3, recording film 5, absorption control layer 7, first reflective layer 8, second reflective layer 9, adhesive layer 10

Disk 15: Substrate 1, heat diffusion layer 2, protective layer 3, recording film 5, absorption control layer 7, adhesive layer 10

Disk 16: Substrate 1, protective layer 3, lower surface protect layer 4, recording film 5, upper surface protect layer 6, absorption control layer 7, first reflective layer 8, second reflective layer 9, adhesive layer 10

Disk 17: Substrate 1, protective layer 3, lower surface protect layer 4, recording film 5, upper surface protect layer 6, absorption control layer 7, first reflective layer 8, adhesive layer 10

Disk 18: Substrate 1, protective layer 3, lower surface protect layer 4, recording film 5, upper surface protect layer 6, absorption control layer 7, second reflective layer 9, adhesive layer 10

Disk 19: Substrate 1, protective layer 3, lower surface protect layer 4, recording film 5, upper surface protect layer 6, absorption control layer 7, adhesive layer 10

Disk 20: Substrate 1, heat diffusion layer 2, lower surface protect layer 4, recording film 5, upper surface protect layer 6, absorption control layer 7, first reflective layer 8, second reflective layer 9, adhesive layer 10

Disk 21: Substrate 1, heat diffusion layer 2, lower surface protect layer 4, recording film 5, upper surface protect layer 6, absorption control layer 7, first reflective layer 8, adhesive layer 10

Disk 22: Substrate 1, heat diffusion layer 2, lower surface protect layer 4, recording film 5, upper surface protect layer 6, absorption control layer 7, second reflective layer 9, adhesive layer 10

Disk 23: Substrate 1, heat diffusion layer 2, lower surface protect layer 4, recording film 5, upper surface protect layer 6, absorption control layer 7, adhesive layer 10

Disk 24: Substrate 1, protective layer 3, lower surface protect layer 4, recording film 5, upper surface protect layer 6, absorption control layer 7, first reflective layer 8, second reflective layer 9, adhesive layer 10

Disk 25: Substrate 1, protective layer 3, lower surface protect layer 4, recording film 5, upper surface protect layer 6, absorption control layer 7, first reflective layer 8, adhesive layer 10

Disk 26: Substrate 1, protective layer 3, lower surface protect layer 4, recording film 5, upper surface protect layer 6, absorption control layer 7, second reflective layer 9, adhesive layer 10

Disk 27: Substrate 1, protective layer 3, lower surface protect layer 4, recording film 5, upper surface protect layer 6, absorption control layer 7, adhesive layer 10

Disk 28: Substrate 1, protective layer 3, lower surface protect layer 4, recording film 5, absorption control layer 7, first reflective layer 8, second reflective layer 9, adhesive layer 10

Disk 29: Substrate 1, protective layer 3, lower surface protect layer 4, recording film 5, absorption control layer 7, first reflective layer 8, second reflective layer 9, adhesive layer 10

Disk 30: Substrate 1, protective layer 3, lower surface protect layer 4, recording film 5, absorption control layer 7, first reflective layer 8, adhesive layer 10

Disk 31: Substrate 1, protective layer 3, lower surface protect layer 4, recording film 5, absorption control layer 7, adhesive layer 10

Disk 32: Substrate 1, protective layer 3, recording film 5, upper surface protect layer 6, absorption control layer 7, first reflective layer 8, second reflective layer 9, adhesive layer 10

Disk 33: Substrate 1, protective layer 3, recording film 5, upper surface protect layer 6, absorption control layer 7, second reflective layer 9, adhesive layer 10

Disk 34: Substrate 1, protective layer 3, recording film 5, upper surface protect layer 6, absorption control layer 7, first reflective layer 8, adhesive layer 10

Disk 35: Substrate 1, protective layer 3, recording film 5, upper surface protect layer 6, absorption control layer 7, adhesive layer 10

Disk 36: Substrate 1, protective layer 3, recording film 5, upper surface protect layer 6, absorption control layer 7, first reflective layer 8, second reflective layer 9, adhesive layer 10

Disk 37: Substrate 1, protective layer 3, recording film 5, absorption control layer 7, second reflective layer 9, adhesive layer 10

Disk 38: Substrate 1, protective layer 3, recording film 5, absorption control layer 7, first reflective layer 8, adhesive layer 10

Disk 39: Substrate 1, protective layer 3, recording film 5, absorption control layer 7, adhesive layer 10

(23) The recording/reproduction characteristic is improved simply by securing a desired range of thickness or material of each layer independently. A higher effect can be achieved, however, by combining the desired ranges of the respective factors.

(24) A better characteristic is obtained in the case where the recording film has a composition defined as $0.12 \leq x \leq 0.24$, $0.20 \leq y \leq 0.31$, $0.54 \leq z \leq 58$, $0 \leq w \leq 0.04$.

Further, in the case where the Ge amount reaches not less than 20 atomic % in this range, the read light endurance is improved by 1.5 times. The read light endurance is obtained by determining, and by comparison with, the power of the read light for reducing the recording signal by 2 dB or more during a five-minute reproduction. For the Ge amount of not more than 17 atomic %, on the other hand, the extinction ratio is large also in the case where the linear speed is high, thus producing a superior figure of not less than 30 dB for 12 m/s.

In the case where M is Ag, the recording sensitivity is improved by 10% as compared with Ge—Sb—Te. In the case where M is at least one of Cr, W and Mo, on the other hand, the possible number of overwrite cycles at which the jitter increases at least 5% is improved three times or more in a multiplicity of overwrite cycles, as compared with Ge—Sb—Te. In the case where M is at least one of Pt, Co and Pd, the crystallization temperature is increased by at least 50° C. as compared with Ge—Sb—Te.

Also, in the case where the impurities elements in the recording film are not more than 5 atomic %, the deterioration of the rewrite characteristic can be reduced desirably. The figure of not more than 2 atomic % produces a more desirable result.

The thickness of the recording film is desirably not less than 10 nm but not more than 30 nm, and the figure of not less than 13 nm but not more than 20 nm is more desirable.

Though somewhat time-consuming, mixing nitrogen with the sputtering gas at the start or end of the fabrication process of the recording film or using a target mixed with a small amount of nitrogen in the composition of the recording film or otherwise containing nitrogen in the neighborhood of the boundary between the recording film and other layers improves the adhesion for an improved characteristic.

BEST MODE FOR CARRYING OUT THE INVENTION

Figure 1:
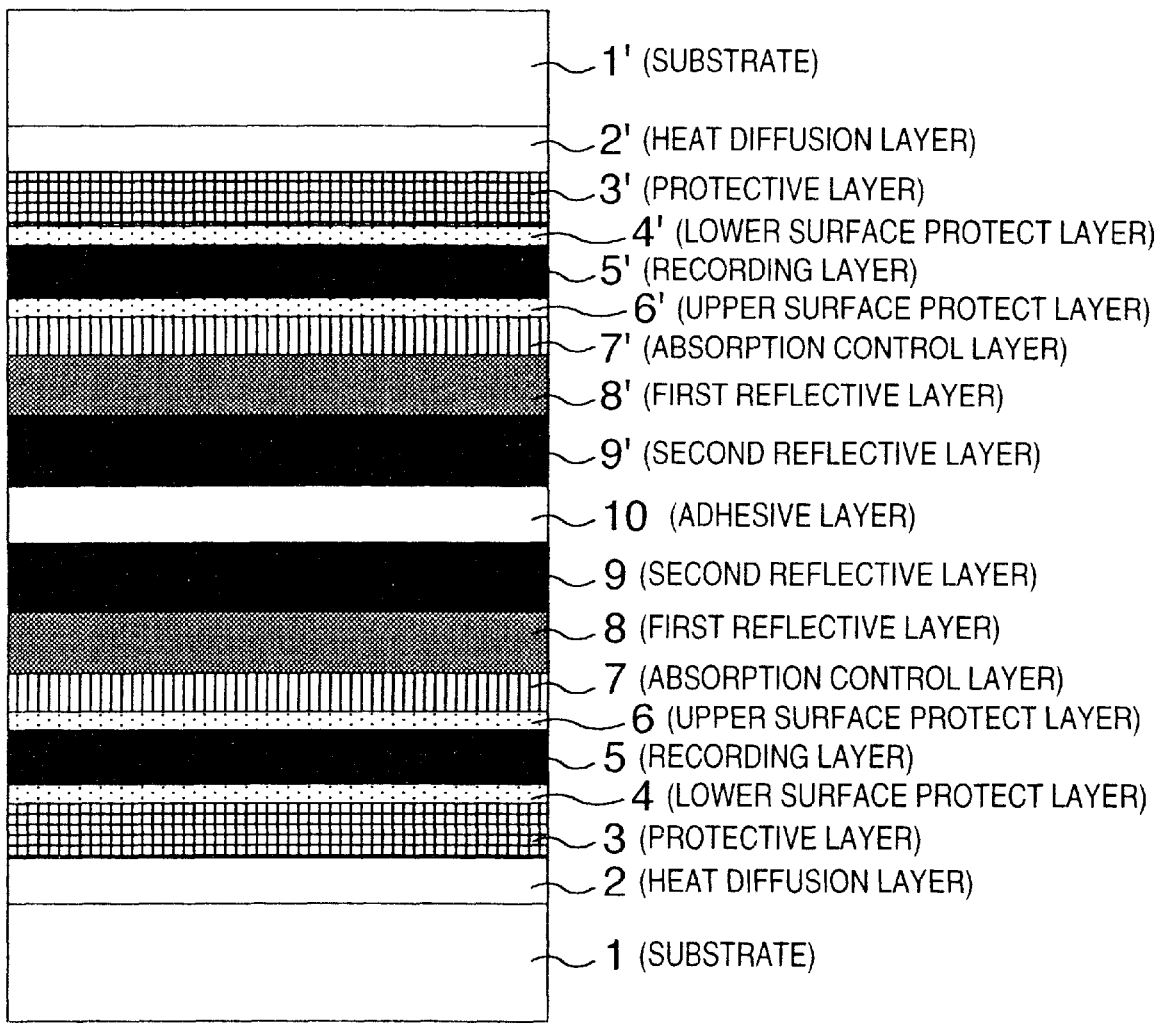
FIG. 1 is a sectional view showing a structure of an information recording medium according to embodiment 1 of the present invention.

The present invention will be explained in detail below with reference to embodiments.

The reference numerals used in the drawings are defined below.

1, 1': Substrate
2, 2': Heat diffusion layer
3, 3': Protective layer
4, 4': Lower surface protect layer
5, 5': Recording film
6, 6': Upper surface protect layer
7, 7': Absorption control layer
8, 8': First reflective layer
9, 9': Second reflective layer
10: Adhesive layer
11, 11': Reflective layer
T: Window width (Tw)
Pr: Low power level
Pe: Intermediate power level
Ph: High power level
Pp: Preheat power level
Pl: Level of power 0
Tc: Cooling pulse width
Tp: Preheat level width
Other reference numerals are defined in the drawings.

(1) Embodiment 1
(Configuration and Fabrication Method)

FIG. 1 is a sectional view showing a structure of a disk-type information recording medium according to embodiment 1 of this invention. This medium was fabricated in the following manner.

First, a heat diffusion layer 2 of $Al_2O_3$ film was formed in the thickness of about 30 nm on a polycarbonate substrate 12 cm in diameter and 0.6 mm thick having a tracking groove in the surface thereof. Then, a protective layer 3 of ZnS film about 45 nm thick, a lower surface protect layer 4 of $SiO_2$ film about 5 nm thick, a recording film 5 of $Ge_{14}Sb_{29}Te_{17}$ about 15 nm thick, an upper surface protect layer 6 of $SiO_2$ film about 15 nm thick, an absorption control layer 7 of $MO_{80}(SiO_2)_{20}$ film about 18 nm thick, a first reflective layer 8 of $Al_{89}Ti_{11}$ about 20 nm thick, and a second reflective layer 9 of $Al_{98}Ti_2$ film about 180 nm thick were formed sequentially. The film lamination was formed by a magnetron sputtering apparatus. In this way, a first disk member was obtained.

On the other hand, a second disk member having the same configuration as the first disk member was obtained by exactly the same method. The second disk member was produced in such a manner that a heat diffusion layer 2' of $Al_2O_3$ film, a protective layer 3' of ZnS film about 45 nm thick, a lower surface protect layer 4' of $SiO_2$ film about 5 nm thick, a recording film 5' of $Ge_{14}Sb_{29}Te_{57}$ about 15 nm thick, an upper surface protect layer 6' of $SiO_2$ film about 15 nm thick, an absorption control layer 7' of $Mo_{80}(SiO_2)20$ film about 18 nm thick, a first reflective layer 8' of $Al_{89}Ti_{11}$ film about 20 nm thick, and a second reflective layer 9' of a $Al_{98}Ti_2$ film about 180 nm thick, were sequentially formed on a substrate 1' having a diameter of 12 cm and 0.6 mm thick.

After that, the first disk member and the second disk member were attached to each other with the second reflective layers 9, 9' thereof face to face through an adhesive layer 10, thereby producing a disk-type information recording medium shown in FIG. 1.

(Initial Crystallization)

The recording films 5, 5' of the medium fabricated in the manner described above were subjected to initial crystallization in the following manner. Only the recording film 5 which is treated exactly the same way as the recording film 5' is described below.

The medium is rotated so that the linear speed of a point on the recording track is 8 m/s. The laser light power of a semiconductor laser (about 810 nm in wavelength) with a laser light power of 800 mW having an elliptical spot long radially of the medium was radiated on the recording film 5 through the substrate 1. The spot was moved by being displaced by ¼ of the spot length each time radially of the medium. By doing so, the initial crystallization was effected. One session of the initial crystallization is sufficient. Nevertheless, three repeated sessions of the initial crystallization could somewhat reduce the noise increase due to the initial crystallization. This initial crystallization can be advantageously carried out at high speed.

(Recording, Erasure and Reproduction)

Then, while conducting the tracking and automatic focusing operation in the recording area of the recording film 5 for which the initial crystallization was completed in the manner described above, information was recorded by changing the power of the recording laser light between the intermediate power level (4.5 mW) and the high power level Ph (11 mW). The linear speed of the recording track is 9 m/s, the semiconductor laser wavelength is 636 nm, and the numerical aperture (NA) of the lens is 0.6. The amorphous or similar portion formed in the recording area by the recording laser light constitutes a recording point. The reflectance of this medium is higher in crystal state, and the area which turned amorphous by recording has a lower reflectance.

Figure 3:
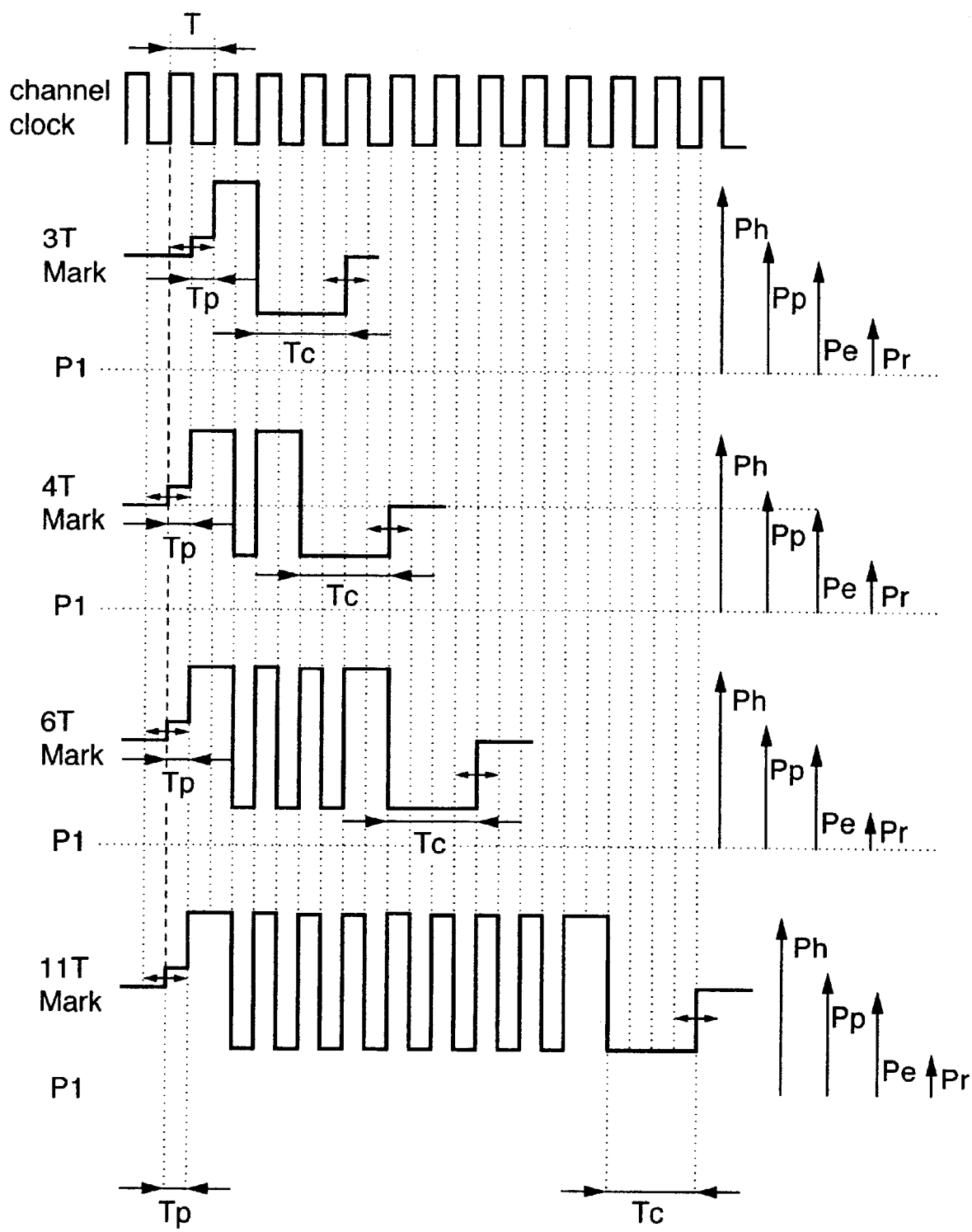
FIG. 3 shows recording waveforms used for evaluation of the recording/reproduction characteristic of an information recording medium according to the present invention.

The power ratio in the range of 1:0.3 to 1:0.6 between high level and intermediate level of the recording laser light is especially preferable. Also, other power levels can be employed for each short time. The recording/reproduction are performed by a device having means in which, as shown in FIG. 3, while one recording mark is being formed, the power is repeatedly reduced to a level lower than the intermediate power level by one half of the window width (Tw/2) each time, and a waveform having a preheat level Pp (4.6 mW) at the head of the recodring pulse is generated. Then, a reproduced signal waveform was obtained which has an especially low jitter value and low error rate. The preheat level is slightly higher than the intermediate level and lower than the high level. This waveform has the feature that the preheat level width Tp (length for which the preheat level is held) changes by the combination of the recording mark and the length of the space formed immediately before the recording mark and the feature that the cooling pulse width Tc (time width during which the level is reduced to Pr at the end of the recording pulse) is determined by the combination of the recording mark and the length of the space following the particular mark. The shorter the space immediately before the mark and the longer the mark, the longer the Tp, while the longer the space immediately before the mark and the shorter the mark, the longer the width Tp. Depending on the structure of the medium, however, in the case where Tp of the recording waveform of the 6 Tw mark is especially long, the jitter can be reduced effectively. Also, the longer the space following the mark and the longer the mark, the shorter the width Tc, while the shorter the space following the mark and the shorter the mark, the long the Tc.

In FIG. 3, only the recording waveforms of 3 Tw, 4 Tw, 6 Tw and 11 Tw are shown. The waveform of 5 Tw is such that among a series of the pulse train having a high power level in the recording waveform of 6 Tw, one each of the high power level Ph of Tw/2 and the immediately following low power level Ph of Tw/2 are removed. In the recording waveforms 7 Tw to 10 Tw, on the other hand, a set of the high power level Ph of Tw/2 and the low power level Ph of Tw/2 is added immediately before the pulse of high power level at the tail end of the recording waveform of 6 Tw. It follows, therefore, that the recording waveform of 11 Tw is the result of adding five such sets. The length of the shortest recording mark corresponding to 3Tw is set to 0.42 µm. Once the portion to be recorded is passed, the laser light power is reduced to the low power level Pr (1.5 mW) for reproduction (reading). The recording signal contains dummy data with a repetition of the 4T mark and the 4T space at the starting end and the tail end of the information signal. The starting end also contains VFO.

In this recording method, the portion where information is already recorded can be rewritten into new information by overwriting the new information without erasure. In other words, the overwrite operation with a substantially circular single light spot is possible.

As an alternative, in the first one or a plurality of disk rotations during the overwrite operation, the continuous light of the intermediate power level (4.5 mW) or a power level proximate thereto of the power-modulated recording laser light is radiated thereby to erase the recorded information, and then during the next one rotation, the recording operation is performed by radiating the laser light power-modulated in accordance with the information signal, between the low power level (1.5 mW) and the high power level (11 mW) or between the intermediate power level (4.5 mW) and the high power level (11 mW). By recording after erasing the information in this way, the remanence of the information previously written is reduced. Thus, the overwrite operation becomes easy even when the linear speed is increased to twice.

These methods are effective not only with the recording film used for the medium according to the invention but also with the recording film of other media.

Figure 4:
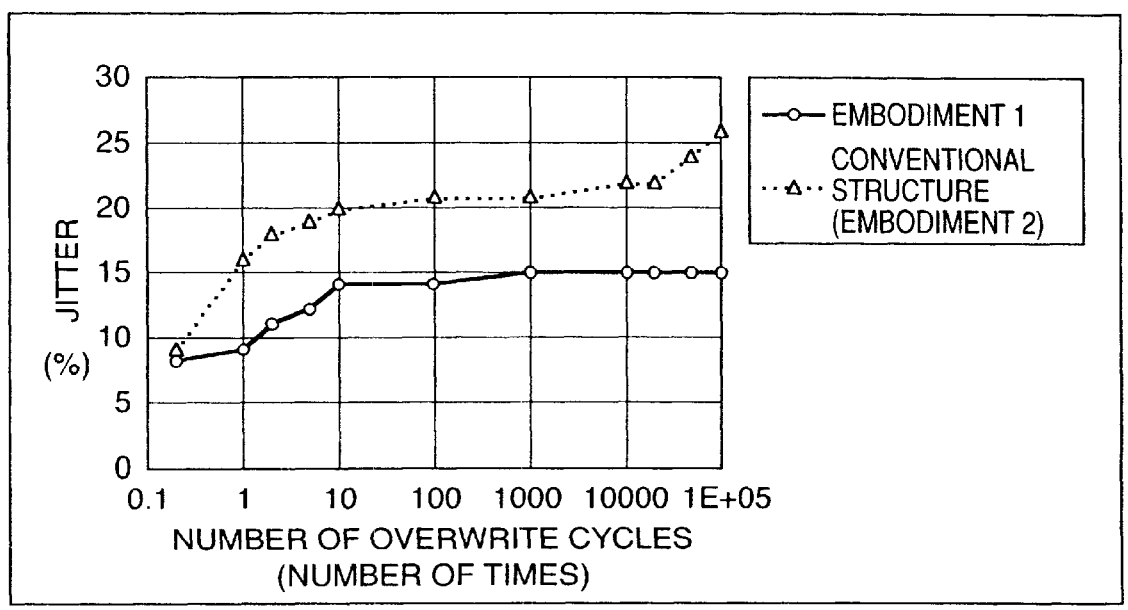
FIG. 4 shows the rewrite characteristic of an information recording medium according to the invention and an information recording medium of the current structure.

When the recording and erase operations are repeated in the information recording medium according to this embodiment, the jitter (σ/Tw) is reduced by 6% or more as compared with the conventional information recording medium described in embodiment 2 for each overwrite cycle, as shown in FIG. 4. The jitter is an indicator of the degree to which the reproduction signal fluctuates with respect to the window width (Tw) when reproducing the position of the edge portion of the recording mark. With the increase in the jitter value, the detection position of the edge portion represents a major proportion of the window width and therefore the recording signal cannot be accurately reproduced. Thus, the jitter is desirably as small as possible. The reason why the jitter has been reduced is that the absorption can be controlled by the absorption control layer so that the remanence can be reduced also at the time of recording with high linear speed.

Observing the recording mark under the transmission electron microscope, the mark size (mark area) was compared between the case in which the long mark (amorphous state) is rewritten and the case in which the long space (crystal state) is overwritten. In the case of the information recording medium according to this embodiment, the former has been found to be substantially the same as the latter. Under the strong absorption control, however, the former is slightly smaller than the latter. For the information recording medium described in embodiment 2, on the other hand, the former is larger than the latter.

When recording information on an information recording medium, the number of times of recording at one point of an information recording medium is generally said to be about 100 thousands. In this embodiment, therefore, the recording/reproduction characteristic from the first recording to the end of 100 thousands of overwrite cycles was studied.

The window width (Tw) in jitter measurement is 16 ns, the shortest recording signal is 3 Tw and the longest recording signal is 11 Tw, which are randomly recorded. A reproduction equalizing circuit was used for the measurement.

The absorption control layer, which is effective also in other recording schemes, has an especially high effect of reducing the jitter by recording the edge portion accurately in the mark edge recording. The mark edge recording is a recording scheme in which the edge portion of a recording mark is regarded as "1" while the space between marks and the interior of the marks are regarded as "0". Further, the effect is conspicuous where the linear speed is higher than 6 m/s.

The effect of the absorption control layer, though observed also at the time of low density recording, becomes conspicuous at the time of high density recording. An example is the case of recording on a land-groove recording substrate at a track pitch of not less than 0.53 μm but not more than 0.65 μm and/or with the shortest mark length of not less than 0.39 μm but not more than 0.45 μm. The modulation degree is increased and the rewrite characteristic is desirably improved for the recording/reproduction wavelength of not less than 600 nm but not more than 660 nm. Also for the wavelength shorter than 600 nm, the medium according to this embodiment is usable by correcting the film thickness in accordance with the wavelength ratio.

(Absorption Control Layer)

In this embodiment, changing the thickness of the film used in the absorption control layers 7, 7', the jitter (σ/Tw) after 10 overwrite cycles was measured, and the following result was obtained.

The square mean value (%) of the jitter and the modulation degree (%) of the front edge and the trailing edge after ten overwrite cycles are indicated with respect to the thickness (nm) of the absorption control layer. Unless otherwise specified, the jitter is expressed by the square mean of the jitter values at the front edge and the trailing edge.

The modulation degree (Mod) was calculated according to the following equation.

Mod (%)=100×(Ic−Ia)/Ic where Ic is the highest level of reflectance of the crystal (erased) state at the time of EFM signal recording and Ia the lowest level of reflectance of the amorphous (recorded) state at the time of EFM signal recording.

Mod (%)=100×(Ic−Ia)/Ic

| Absorption control layer thickness (nm) | Jitter after 10 overwrite cycles (%) | Modulation degree (%) |
| --- | --- | --- |
| 2 | 25 | — |
| 5 | 20 | — |
| 10 | 15 | 53 |
| 20 | 13 | 51 |
| 40 | 13 | 47 |
| 50 | — | 43 |
| 60 | — | 40 |

This indicates that in the case where the thickness of the absorption control layer is reduced, the jitter after 10 overwrite cycles increases while in the case where the thickness of the absorption control layer is increased, the modulation degree is increased. The jitter is increased with the decrease in the absorption control layer thickness, probably because the reduction in the absorption ratio (Ac/Aa), i.e. the ratio between the absorption coefficient Ac of the recording film in crystal state and the absorption coefficient Aa of the recording film in amorphous state fails to sufficiently control the absorption, and the remanence is caused. The absorption ratio (Ac/Aa), which cannot be actually measured, was determined by optical calculations. The result shows that the thickness of the absorption control layer is desirably not less than 5 nm but not more than 50 nm, and more desirably not less than 10 nm but not more than 40 nm.

In this embodiment, optical calculations were carried out by changing the input values n and k and the optical constants of the film used for the absorption control layers 7, 7'. First, maintaining k at 1.7 while changing n, the absorption ratio (Ac/Aa) was determined as follows.

| n | Ac/Aa |
| --- | --- |
| 0.5 | 0.9 |
| 1.2 | 1.0 |
| 1.8 | 1.05 |
| 2.0 | 1.11 |
| 3.0 | 1.13 |
| 4.5 | 1.12 |
| 5.5 | 1.07 |
| 6.0 | 1.00 |
| 6.5 | 0.9 |

This indicates that with the change in n of the absorption control layer, the absorption ratio (Ac/Aa) changes. Therefore, n of the absorption control layer is desirably not less than 1.2 but not more than 6 and more desirably not less than 1.8 but not more than 5.5.

Then, maintaining n at 3.3 and changing k, the absorption ratio (Ac/Aa) was determined as follows.

| k | Ac/Aa |
| --- | --- |
| 0 | 0.97 |
| 0.5 | 1.02 |
| 0.8 | 1.1 |
| 1.5 | 1.11 |
| 1.8 | 1.13 |
| 2.5 | 1.13 |
| 3.0 | 1.08 |
| 3.3 | 1.01 |
| 4.5 | 0.95 |

This indicates that with the change in k of the absorption control layer, the absorption ratio (Ac/Aa) changes. Therefore, k of the absorption control layer is desirably not less than 0.5 but not more than 3.3 and more desirably not less than 0.8 but not more than 3.

According to this embodiment, the jitter (σ/Tw) and the recording sensitivity after 10 overwrite cycles were measured by changing the composition ratio of Mo—($SiO_2$) used for the absorption control layers 7, 7', and the following result was obtained. The recording sensitivity, which was based on $Mo_{80}(SiO_2)_{20}$, is indicated as + when improved, as − when deteriorated and as 0 when unchanged.

| Absorption control layer composition | Jitter (%) | Recording sensitivity (%) |
| --- | --- | --- |
| $Mo_{20}(SiO_2)_{80}$ | 25 | Not measured |
| $Mo_{35}(SiO_2)_{65}$ | 22 | Not measured |
| $Mo_{42}(SiO_2)_{58}$ | 20 | +10 |
| $Mo_{50}(SiO_2)_{50}$ | 18 | +10 |
| $Mo_{61}(SiO_2)_{39}$ | 15 | +5 |
| $Mo_{67}(SiO_2)_{33}$ | 14 | +3 |

-continued

| Absorption control layer composition | Jitter (%) | Recording sensitivity (%) |
|---|---|---|
| $Mo_{72}(SiO_2)_{28}$ | 13 | 0 |
| $Mo_{80}(SiO_2)_{20}$ | 13 | 0 |
| $Mo_{90}(SiO_2)_{10}$ | — | 0 |
| Mo | — | −5 |

This indicates that with the increase in the amount of Mo with respect to the composition of the absorption control layer, the jitter after 10 overwrite cycles can be reduced. The jitter is reduced probably by reason of the fact that the absorption ratio (Ac/Aa) is so large that the remanence is hard to occur. The Mo amount that represents of the total composition of the absorption control layer, therefore, is preferably not less than 42 mol %. Also, Mo itself has a larger heat conductivity than $Mo$—$(SiO_2)$ and therefore, the use of Mo alone, somewhat reduces the recording sensitivity. The desirable amount of Mo is not less than 61 mol % but not more than 90 mol %.

In this embodiment, the $Mo$—$(SiO_2)$ film used for the absorption control layers 7, 7' was analyzed by the X-ray photoelectron spectrography, and it was found that the $Mo$—$(SiO_2)$ film is composed mainly of a metal (Mo) and a dielectric material ($SiO_2$). Depending on the composition ratio, the peak of the metal Mo sightly lowers with the peak corresponding to the Mo oxide appearing. However, the main peak appears at the position of the metal Mo, and if an oxide, oxygen is not saturated. This is because oxygen is exchanged between the metal (Mo) and the dielectric material ($SiO_2$) in the absorption control layer, and the composition ratio for the compound as a whole is $Mo$—$(SiO_2)$. In the case where the dielectric material is a compound other than the oxide, the same effect is obtained as if oxygen has directly replaced other elements. A sulfide such as $Sb_2S_3$, for example, includes Mo and $Sb_2S_3$, and depending on the composition ratio, a peak corresponding to the Mo sulfide appears other than the peak of the metal Mo.

As described above, it was found that the absorption control layer is composed of a metal element or an unsaturated metal oxide and a dielectric material.

A similar result was obtained by use of Cr, W, Fe, Sb, Mn, Ti, Co, Ge, Pt, Ni, Nb, Pd, Be or Ta as a replacement material of Mo in the $Mo$—$(SiO_2)$ film used for the absorption control layers 7, 7'. Among these elements, Re and W are high in melting point and more desirable. Pd and Pt, on the other hand, are less reactive with other layers and therefore have desirably a further increased possible number of overwrite cycles. The use of Ni or Co makes an inexpensive target usable as compared with other elements, and can reduce the total production cost. Cr and Ti have a high anticorrosiveness and the result of the life test on them was superior to that of others. Also, Tb, Gd, Sm, Cu, Au, Ag, Ca, Al, Zr, Ir, Hf, etc. are also usable.

In this embodiment, the materials usable instead of $SiO_2$ in the $Mo$—$(SiO_2)$ film used with the absorption control layers 7, 7' are oxides including SiO, $Al_2O_3$, BeO, $Bi_2O_3$, CoO, CaO, $Cr_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, NiO, PbO, PdO, SnO, $SnO_2$, $Sc_2O_3$, SrO, $ThO_2$, $TiO_2$, $Ti_2O_3$, TiO, $Ta_2O_5$, $TeO_2$, VO, $V_2O_3$, $VO_2$, $WO_2$, $WO_3$, $Y_2O_3$ and $ZrO_2$, nitrides including AlN, Bn, CrN, $Cr_2N$, GeN, HfN, $Si_3N_4$, Al—Sn—N group material (such as $AlSiN_2$), Si—N group material, Si—O—N group material, TaN, TiN and ZrN, sulfides including ZnS, $Sb_2S_3$, CdS, $In_2S_3$, $Ga_2S_3$, GeS, $SnS_2$, PbS, $Bi_2S_3$, SrS, MgS, CrS, CeS and TaS, selenides including $SnSe_2$, $Sb_2Se_3$, CdSe, ZnSe, $In_2Se_3$, $Ga_2Se_3$, GeSe, $GeSe_2$, SnSe, PbSe and $Bi_2Se_3$, fluorides including $CeF_3$, $MgF_2$, $CaF_2$, $TiF_3$, $NiF_3$, $FeF_2$ and $FeF_3$, Si, Ge, borides including $TiB_2$, $B_4C$, B, CrB, $HfB_2$, $TiB_2$ and WB, carbides including C, $Cr_3C_2$, $Cr_{23}C_6$, $Cr_7C_3$, $Fe_3C$, $MO_2C$, WC, $W_2C$, HfC, TaC and $CaC_2$, or a material having a composition similar to the materials described above or a mixture thereof. In addition, In—Sb, Ga—As, In—P, Ga—Sb, In-As, etc. could also be used.

Among these materials, the use of $SiO_2$, $Ta_2O_3$, $Y_2O_3$'$ZrO_3$ or the like oxides makes it possible to use a target less expensive than when using other materials, and therefore can reduce the total cost of production. Among the oxides, $SiO_2$, $Ta_2O_5$, $Y_2O_3$—$ZrO_2$ are less reactive and desirably have an increased number of overwrite cycles. BeO and $Cr_2O_3$ are also desirable as they have a high melting point. $Al_2O_3$ is high in heat conductivity, and therefore, in the case where it is made into a disk having a structure lacking the first reflective layer and/or the second reflective layer, is less deteriorated than other materials in the rewrite characteristic.

The use of a nitride, on the other hand, increases the adhesion with the layers adjoining the absorption control layer and becomes resistant to an external shock. When a sulfide or selenide is used, on the other hand, the sputter rate can be increased for a shortened film-making time. In the case where a carbide is used, the hardness of the absorption control layer is increased thereby to suppress the flow of the recording film for a multiplicity of overwrite cycles.

A metal element and/or a dielectric material, if having a melting point higher than the melting point (about 60° C.) of the recording film, can suppress the jitter increase at the time of ten thousand overwrite cycles. In the case where the two materials have a melting point of not lower than 600° C., the jitter increase can be desirably suppressed to not more than 3%.

Also, in the case where the impurities elements in the absorption control layer exceeds 2 atomic % of the components of thereof, the jitter at the front or trailing edge after 10 overwrite cycles is found to exceed 15%. Further, when the impurities elements exceed 5 atomic %, the jitter is found to increase to 18% or more. Thus, the deterioration of the rewrite characteristic can be desirably reduced when the impurities elements contained in the absorption control layer is not more than 5 atomic %. The figure of not more than 2 atomic % is more desirable.

(Measurement of Optical Constants of Absorption Control Layer)

Separating the disk member between the upper surface protect layer and the absorption control layer, the reflectance was studied for the recording/reproduction wavelength. Specifically, the second reflective layer 9 about 180 nm thick, the first reflective layer 8 of $Al_{89}Ti_{11}$ film about 20 nm thick and the absorption control layer 7' of $MO_{80}(SiO_2)_{20}$ film about 18 nm thick are deposited on the adhesive layer 10.

Then, by the counter sputtering (Ar gas etching) with the sputtering device, the reflectance was measured with the $MO_{80}(SiO_2)_{20}$ film reduced in thickness. The thickness of the film etched was masked partly at the time of etching, and after etching, the mask was removed and the reflectance was measured with step meter. After repeating this operation twice, the following values of the absorption control layer thickness and the reflectance were obtained.

| Absorption control layer thickness | Reflectance (%) |
|---|---|
| 18 | 27 |
| 10 | 49 |
| 0 | 75 |

As to n and k of the reflective layer, on the other hand, the surface of the reflective layer was exposed by separation and the values n and k were determined by the ellipsometry with variable wavelengths.

From the reflectance and n and k of the reflective layer thus obtained, the values n and k which indicate the reflectance of structures having different thicknesses of the absorption control layer were determined by calculation. As a result, it has been found that n is 3.3 and k is 1.3.

(Surface Protect Layers)

A desirable material replacing $SiO_2$ of the upper surface protect layer 6 and the lower surface protect layer 4 is $Al_2O_3$ or a mixture of $Al_2O_3$ and $SiO_2$. In the case where the $SiO_2$ or $Al_2O_3$ content is not less than 70 mol %, the crystallization rate is increased, so that the extinction ratio increases to not less than 25 dB even for the speed of 18 m/s which is about twice as high as the speed in the absence of the surface protect layer.

The next desirable materials replacing $SiO_2$ of the upper surface protect layer 6 and the lower surface protect layer 4 are $Ta_2O_5$, a mixture between $Ta_2O_5$ and $SiO_2$ or $Al_2O_{31}$ followed by $ZrO_2$-$Y_2O_3$, $SiO_2$ or a mixture thereof with $Al_2O_3$ or $Ta_2O_5$. Among them, $Al_2O_3$ can suppress the fluctuations of the reflectance level during a multiplicity of overwrite cycles to not more than 5%, thus reducing the jitter desirably. CoO, $Cr_2O_3$ and NiO are more desirable as a uniform crystal grain size is obtained by initial crystallization so that the jitter increases to lesser degree in the initial stage of overwrite operation.

Also, nitrides such as AlN, BN, CrN, $Cr_2N$, GeN, HfN, $Si_3N_4$, Al—Sn—N group material (such as $AlSiN_2$), Si—N group material, Si—O—N group material, TaN, TiN and ZrN increases the adhesion, and the information recording medium is desirably less deteriorated under external shocks. A material having the same composition as the recording film containing nitrogen or a material of a similar composition also improves the adhesion.

Other materials usable include oxides including BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$ and $WO_3$, and carbides including C, $Cr_3C_2$, $Cr_{23}C_6$, $Cr_7C_3$, $Fe_3C$, $Mo_2C$, WC, $W_2C$, HfC, TaC and $CaC_2$, or a material having a composition similar to the materials described above.

Also, a mixture of these materials may be used.

The upper surface protect layer 6, the lower surface protect layer 6, or the materials used in place of the upper surface protect layer 6 and the lower surface protect layer 4 desirably represent not less than 90% of all the atoms of the respective surface protect layers. In the case where the impurities other than these materials increases to 10 atomic % or more, the possible number of overwrite cycles is reduced by 50% or more or otherwise the write characteristic is deteriorated.

In the absence of the upper surface protect layer, diffusion occurs into the recording film of the reflective layer material, and the remanence increases, so that the reduction in the reflectance level due to 100 thousand overwrite cycles is small and can be suppressed to 5% or less. With the change in the reflectance level, the reproduction signal level develops an offset, and the jitter increases by the amount equal to the offset resulting in an increased jitter. For this reason, the variations of the reflectance level are better smaller.

Further, in order to maintain the modulation degree at 43% or more, the figure of no more than 12 nm is desirable. For the figure of not more than 5 nm, the modulation degree can be increased to 47% or more. A uniform film is formed with the figure of about 2 nm or more, and therefore, when the thickness of the upper surface protect layer is maintained between 2 and 12 nm, the recording/reproduction characteristic is desirably improved.

In the absence of the lower surface protect layer, diffusion occurs into the recording film of a protective layer material, and the remanence increases, so that the jitter increases by more than 6% at the time of 100 thousand overwrite cycles. Further, in order to maintain the modulation degree at 43% or more, the thickness is desirably not more than 25 nm. For the thickness of 5 nm or more but not more than 10 nm, the modulation degree can be maintained at 47% or more. A uniform film is formed when the thickness is not less than about 2 nm, and therefore, by maintaining the thickness of the lower surface protect layer between 2 and 25 nm, the recording/reproduction characteristic can be improved desirably.

(Protective Layer)

According to this embodiment, the protective layer 2 is formed of ZnS.

The materials that can replace ZnS of the protective layer 2 include a Si—N group material, a Si—O—N group material, oxides such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$ and MgO, nitrides such as TaN, AlN, BN, $Si_3N_4$, GeN and Al—Sn—N group material (such as $AlSiN_2$), sulfides such as ZnS, $Sb_2S_{37}$ CdS, $In_2S_3$, $Ga_2S_3$, GeS, $SnS_2$, PbS and $Bi_2S_3$, selenides such as $SnSe_2$, $Sb_2Se_3$, CdSe, ZnSe, $In_2Se_3$, $Ga_2Se_3$, GeSe, $GeSe_2$, SnSe, PbSe and $Bi_2Se_3$, fluorides such as $CeF_3$, $MgF_2$ and $CaF_2$, or Si, Ge, $TiB_2$, $B_4C$, B, C, or materials having a similar composition to the materials described above. Also, ZnS—$SiO_2$, ZnS—$Al_2O_3$, etc. or a mixture layer or a multi-layer of these materials may be used. Among them, ZnS has a large n and can maintain a large modulation degree. In the case of a mixture containing 60 mol % or more of this material, the advantageous points of the large n of ZnS and the chemical stability of the oxide are combined with each other. Further, ZnS has a large sputter rate, so that when ZnS represents at least 80 mol %, the film-fabrication time can be shortened. Other sulfides and selenides can produce a similar characteristic.

The desirable element ratio of these compounds, as expressed by the ratio between metal element and oxygen for oxides and the ratio between metal element and sulfide element for sulfides, is desirably approximately 2 to 3 for $Al_2O_3$, $Y_2O_3$ and $La_2O_3$, 1 to 2 for $SiO_2$, $ZrO_2$ and $GeO_2$, 2 to 5 for $Ta_2O$, and 1 to 1 for ZnS. Nevertheless, a similar effect can be produced even when the ratio deviates from these figures. The deviation of the ratio from the integral ratio described above, if any, is desirably not more than ±10 atomic % in Al amount from $Al_2O_3$ in terms of the Al-to-O ratio in Al—O, not more than ±10 atomic % in Si amount from $SiO_2$ in terms of the Si-to-O ratio in Si—O. In this way, the deviation of the metal element is desirably not more than 10 atomic %. Once the deviation increases to 10 atomic % or more, the resulting change in the optical characteristics reduces the modulation degree by 10% or more.

The material of the protective layer 2 and the replacement material of the protective layer 2 desirably represent at least 90% of all the atoms of each protective layer. In the case where the impurities other than these materials reach 10 atomic % or more, the possible number of overwrite cycles is reduced to one half or otherwise the rewrite characteristic is deteriorated.

By changing the thickness of the protective layer used in this embodiment, the modulation degree and the jitter ($\sigma$/Tw) after ten overwrite cycles were measured, and the following result was obtained. The calculation formula for the modulation degree (Mod) is as follows.

$$Mod\ (\%) = 100 \times (Ic-Ia)/Ic$$

where Ic is the reflectance level of crystal (erased) state at the time of EFM signal recording, and Ia is the reflectance level of the amorphous (recorded) state at the time of EFM signal recording.

| Protective layer thickness (nm) | Modulation degree (%) | Jitter (%) |
|---|---|---|
| 15 | 41 | — |
| 20 | 43 | — |
| 35 | 48 | 15 |
| 45 | 51 | 14 |
| 60 | 50 | 15 |
| 70 | — | 18 |
| 80 | — | 22 |

The thickness of the protective layer is desirably 20 to 70 nm at which the modulation degree for recording can be increased to 43% or more. The thickness of 35 to 60 nm is more desirable.

(Heat Diffusion Layer)

According to this embodiment, the heat diffusion layer 1 is formed of $Al_2O_3$.

The desirable materials replacing $Al_2O_3$ of the heat diffusion layer 1 are MgO, BeO, SiC, BN are $B_4C$ which have a large heat conductivity. Also, $Ta_2O_5$, $SiO_2$, $Al_2O_3$ and a mixture of any combinations thereof have an inexpensive target and therefore desirably result in a low production cost. $ThO_2$, $TiO_2$, AlN and TiN, on the other hand, are desirable in view of the ease with which to fabricate the film.

Other desirable materials than those described above desirably have a heat conductivity larger than the substrate material and an absorption coefficient k smaller than 0.5.

A large heat conductivity can suppress the thermal damage to the substrate surface at the time of recording, and the jitter can be held at a low level after 100 thousand overwrite cycles. Also, a small k can hold the reduction in modulation degree to a small value.

The materials and the replacement materials of the heat diffusion layer 1 desirably represent 90% or more of all the atoms of each protective layer. Once the impurities other than the materials described above reach 10 atomic % or more, the possible number of overwrite cycles is reduced to one half or less, or otherwise the rewrite characteristic is deteriorated.

Changing the thickness of the heat diffusion layer used in this embodiment, the jitter ($\sigma$/Tw) after 100 thousand overwrite cycles was measured, and the following result was obtained. Also, the study made of the film-fabrication time for all the layers shows that since the sputter rate of the heat diffusion layer is low, the film-fabrication time depends to a large measure on the thickness of the heat diffusion layer. The film-fabrication time for the heat diffusion layer of 30 nm is assumed to be unity.

| Heat diffusion layer thickness (nm) | Jitter (%) | Film-fabrication time |
|---|---|---|
| 0 | 21 | — |
| 10 | 18 | — |
| 20 | 15 | one time |
| 30 | 15 | one time |
| 40 | 15 | one time |
| 50 | — | 1.2 times |
| 60 | — | 1.2 times |

This indicates that the thickness of the heat diffusion layer is desirably 10 to 50 nm, and more desirably 20 to 40 nm.

Also, the jitter increase is suppressed after a multiplicity of overwrite cycles not only for the disk having the structure shown in this invention but also for the disk having the current structure and the phase change disk having other heat diffusion layer.

(Reflective Layer)

The material Al—Cr used for the first reflective layer 6 in this embodiment is desirably replaced by a material containing an Al alloy as a main component such as Al—Ti, Al—Ag or Al—Cu which can reduce the jitter at the time of overwrite operation.

This indicates that the characteristic at the time of a multiplicity of overwrite cycles is improved in the case where the content of the elements other than Al in the Al alloy is not less than 5 atomic % but not more than 30 atomic %. A similar characteristic is obtained for an Al alloy other than those mentioned above.

As an alternative, a layer comprising any of the element units of Au, Ag, Cu, Ni, Fe, Co, Cr, Ti, Pd, Pt, W, Ta, Mo, Sb, Bi, Dy, Cd, Mn; Mg and V, or an alloy with any of these elements as a main component such as an Au alloy, Ag alloy, Cu alloy, Pd alloy, Pt alloy, Sb—Bi, SUS or Ni—Cr, or a combination of any of these alloys. In this way, the first reflective layer is composed of a metal element, a metalloid element, an alloy or a mixture thereof.

Among them, a material having a high reflectance such as Cu alloy, Al alloy or Au alloy increases the modulation degree and exhibits a superior reproduction characteristic. The Ag alloy also has a similar characteristic. The contents of elements other than the main component, like the Al alloy, is set in the range of 5 atomic % to 30 atomic % inclusive, whereby the rewrite characteristic is improved further.

According to this embodiment, the materials of the second reflective layer replacing Al—Ti used in the second reflective layer 9 are desirably Al—Ag, Al—Cu, Al—Cr or the like materials containing the Al alloy as a main component. Al is also usable.

From these facts, it has been found that in the case where the contents of the elements other than Al in the Al alloy is in the range of 0.5 atomic % to 4 atomic % inclusive, the characteristic after a multiplicity of overwrite cycles and the bit error rate are improved and the improvement is further enhanced in the case where the contents are in the range of one atomic % to 2 atomic % inclusive. An Al alloy other than those mentioned above can also produce a similar characteristic.

Also, a layer comprising the element units of Au, Ag, Cu, Ni, Fe, Co, Cr, Ti, Pd, Pt, W, Ta, Mo, Sb, Bi, Dy, Cd, Mn, Mg or V, or an alloy with any of these elements as a main component such as an Au alloy, Ag alloy, Cu alloy, Pd alloy or Pt alloy, or an alloy of any of these alloys as a main component or an alloy of any combinations of these alloys. In this way, the second reflective layer is composed of a metal element, a metalloid element or an alloy or a mixture thereof.

Among them, Cu, Al, Au, Cu alloy, Al alloy, Au alloy or the like which has a large heat conductivity tends to cool the disk rapidly and exhibits a superior rewrite characteristic. The Ag and Ag alloys have also a similar characteristic. The content of elements other than the main component such as Cu, Au or Ag, like the Al alloy, is desirably in the range of 0.5 atomic % to 4 atomic % inclusive, in which case the characteristic after a multiplicity of overwrite cycles and the bit error rate are improved, and the improvement is further enhanced when the contents are in the range of one atomic % to 2 atomic % inclusive.

Also, a study of the refractive index (n) and the extinction coefficient (k) of the materials of the first reflective layer and the second reflective layer shows that n of the first reflective layer is larger than n of the second reflective layer, and in the case where n of the first reflective layer is larger than n of the second reflective layer and k of the first reflective layer is smaller than k of the second reflective layer, the increase of jitter after one hundred thousand overwrite cycles can be suppressed within 3%.

The materials of the first reflective layer and the second reflective layer are desirably not less than 95% of the total number of atoms of each reflective layer. In the case where the impurities other than the materials described above amount to 5 atomic % or more, the possible number of overwrite cycles is reduced to one half or otherwise the rewrite characteristic is deteriorated.

In the case where the second reflective layer is thinner than 30 nm, the strength is so low and the heat diffusion is so small that the recording film is liable to flow. Thus, the jitter after 100 thousand overwrite cycles increases beyond 15%. The thickness of 40 nm can reduce the jitter to 15%. In the case where the thickness of the first reflective layer is larger than 100 nm or the thickness of the second reflective layer is larger than 200 nm, the time for fabricating the respective reflective layer is lengthened to such an extent that the fabrication is divided into two or more processes or two or more vacuum chambers are provided for sputtering, thereby doubling the time required for fabrication. In the case where the thickness of the first reflective layer is not more than 5 nm, on the other hand, it is difficult to form a uniform film.

This indicates that the desirable thickness of the first reflective layer is not less than 5 nm but not more than 100 nm, and that of the second reflective layer is not less than 30 nm but not more than 200 nm.

(Combination of Materials of First Reflective Layer and Second Reflective Layer)

The materials described in this embodiment can be used for the first reflective layer and the second reflective layer. By selecting a combination of the materials, however, it has been found that the increase of jitter after 100 thousand overwrite cycles can be suppressed to not more than 3% for an improved rewrite characteristic. A preferable combination is the first reflective layer of $Al_{94}Cr_6$ with the second reflective layer of $Al_{98}Ti_1$, the first reflective layer of $Al_{90}Ti_{10}$ with the second reflective layer of $Al_{95}Ti_2$, the first reflective layer of $Al_{75}Ti_{25}$ with the second reflective layer of $Al_{99}Ti_1$, or the like combinations in which the first reflective layer and the second reflective layer contain the same main component element and the second reflective layer contains more elements other than the main component element Al than the first reflective layer. The combination of Al—Ti with Al—Ti, the combination of Al—Cr with Al—Cr or the like combination containing an Al alloy such as Al—Ag or Al—Cu as a main component has produced a similar Characteristic. Following these materials, an Au alloy, Ag alloy, Cu alloy or a material of a similar composition has exhibited an improved rewrite characteristic after a multiplicity of overwrite cycles.

(Substrate)

According to this embodiment, a polycarbonate substrate 1 having a tracking groove directly formed in the surface thereof is used. In place of this, polyolefin, epoxy, acrylic resin or a chemically reinforced glass having the surface thereof formed with an ultraviolet setting resin layer may be used with equal effect.

The substrate having a tracking groove is defined as a substrate having a groove at least $\lambda/10n'$ deep (n': refractive index of substrate material), where $\lambda$ is the recording/reproduction wavelength, formed over the whole or in a part of the substrate surface. The groove may be formed either continuously around the whole periphery or in a form split midway. It has been found that crosstalks are reduced desirably for the groove depth of about $\lambda/6n'$. Further, in the case where the groove is deeper than about $\lambda/3n'$, the cross erase is desirably reduced at the sacrifice of a lower yield of the process for forming the substrate.

Also, the groove width may be different at different places. Further, a substrate of sample servo format lacking a groove, or a substrate of other tracking systems or other formats will do. The substrate is either in a format capable of recording and reproduction in both the groove and the land, or in a format capable of recording only in the groove or the land. The disk size is not limited to 12 cm but may assume other sizes such as 13 cm, 3.5' or 2.5'. The disk may be 1.2 mm, 0.8 mm thick or otherwise thick as well as 0.6 mm thick.

According to this embodiment, two disk members are fabricated by exactly the same method, are these disk members are attached to each other with the second reflective layers 9, 9' thereof face to face through an adhesive layer. In place of the second disk member, however, a disk member of another structure or a protective substrate may be used. In the case where the disk members used for attachment or the protective substrate has a large transmittance in the ultraviolet wavelength area, the ultraviolet setting resin may be used for attachment. Other methods may also be used for attachment. In the disk member of a structure lacking the second reflective layer 9, an adhesive layer may be formed on the topmost layer.

In this embodiment, two disk members are prepared, and the first and second disk members are attached to each other with the second reflective layers 9, 9' thereof face to face through the adhesive layer 10. If an ultraviolet setting resin is coated to the thickness of about 10 μm on the second reflective layers 9, 9' before attaching them and they are attached to each other after the resin is set, then the error rate can be reduced further.

Also, according to this embodiment, two disk members are prepared, and the first and second disk members are attached to each other with the second reflective layers 9 thereof face to face through the adhesive layer 10. Without so attaching, however, the ultraviolet setting resin about 10 μm thick may be coated on the second reflective layer 9 of the first disk member.

In the case of a disk member lacking the second reflective layer 9, on the other hand, the ultraviolet setting resin may be coated on the topmost layer.

(Disk Structure)

The structures of the disks 1 to 39 described below other than the structure described above in this embodiment also have the effect of reducing the jitter by reducing the remanence due to the presence of an absorption control layer. The materials, thickness, etc. of each layer are described in detail in the embodiments 1, 3, 4, 5. Also, the disk 3 is described in detail in embodiment 3, the disk 4 in embodiment 6, and the disk 24 in embodiment 5. Among these structures, in the case where the number of layers is 5 or 6 except for the substrate and the adhesive layer, the apparatus used for producing a film is inexpensive and the whole production cost can be reduced.

Disk 1: Substrate 1, heat diffusion layer 2, protective layer 3, lower surface protect layer 4, recording film 5, upper surface protect layer 6, absorption control layer 7, first reflective layer 8, adhesive layer 10

Disk 2: Substrate 1, heat diffusion layer 2, protective layer 3, lower surface protect layer 4, recording film 5, upper surface protect layer 6, absorption control layer 7, second reflective layer 9, adhesive layer 10

Disk 3: Substrate 1, heat diffusion layer 2, protective layer 3, lower surface protect layer 4, recording film 5, upper surface protect layer 6, absorption control layer 7, adhesive layer 10

Disk 4: Substrate 1, heat diffusion layer 2, protective layer 3, lower surface protect layer 4, recording film 5, absorption control layer 7, first reflective layer 8, second reflective layer 9, adhesive layer 10

Disk 5: Substrate 1, heat diffusion layer 2, protective layer 3, lower surface protect layer 4, recording film 5, absorption control layer 7, first reflective layer 8, adhesive layer 10

Disk 6: Substrate 1, heat diffusion layer 2, protective layer 3, lower surface protect layer 4, recording film 5, absorption control layer 7, second reflective layer 9, adhesive layer 10

Disk 7: Substrate 1, heat diffusion layer 2, protective layer 3, lower surface protect layer 4, recording film 5, absorption control layer 7, adhesive layer 10

Disk 8: Substrate 1, heat diffusion layer 2, protective layer 3, recording film 5, upper surface protect layer 6, absorption control layer 7, first reflective layer 8, second reflective layer 9, adhesive layer 10

Disk 9: Substrate 1, heat diffusion layer 2, protective layer 3, recording film 5, upper surface protect layer 6, absorption control layer 7, first reflective layer 8, adhesive layer 10

Disk 10: Substrate 1, heat diffusion layer 2, protective layer 3, recording film 5, upper surface protect layer 6, absorption control layer 7, second reflective layer 9, adhesive layer 10

Disk 11: Substrate 1, heat diffusion layer 2, protective layer 3, recording film 5, upper surface protect layer 6, absorption control layer 7, adhesive layer 10

Disk 12: Substrate 1, heat diffusion layer 2, protective layer 3, recording film 5, absorption control layer 7, first reflective layer 8, second reflective layer 9, adhesive layer 10

Disk 13: Substrate 1, heat diffusion layer 2, protective layer 3, recording film 5, absorption control layer 7, first reflective layer 8, adhesive layer 10

Disk 14: Substrate 1, heat diffusion layer 2, protective layer 3, recording film 5, absorption control layer 7, first reflective layer 8, second reflective layer 9, adhesive layer 10

Disk 15: Substrate 1, heat diffusion layer 2, protective layer 3, recording film 5, absorption control layer 7, adhesive layer 10

Disk 16: Substrate 1, protective layer 3, lower surface protect layer 4, recording film 5, upper surface protect layer 6, absorption control layer 7, first reflective layer 8, second reflective layer 9, adhesive layer 10

Disk 17: Substrate 1, protective layer 3, lower surface protect layer 4, recording film 5, upper surface protect layer 6, absorption control layer 7, first reflective layer 8, adhesive layer 10

Disk 18: Substrate 1, protective layer 3, lower surface protect layer 4, recording film 5, upper surface protect layer 6, absorption control layer 7, second reflective layer 9, adhesive layer 10

Disk 19: Substrate 1, protective layer 3, lower surface protect layer 4, recording film 5, upper surface protect layer 6, absorption control layer 7, adhesive layer 10

Disk 20: Substrate 1, heat diffusion layer 2, lower surface protect layer 4, recording film 5, upper surface protect layer 6, absorption control layer 7, first reflective layer 8, second reflective layer 9, adhesive layer 10

Disk 21: Substrate 1, heat diffusion layer 2, lower surface protect layer 4, recording film 5, upper surface protect layer 6, absorption control layer 7, first reflective layer 8, adhesive layer 10

Disk 22: Substrate 1, heat diffusion layer 2, lower surface protect layer 4, recording film 5, upper surface protect layer 6, absorption control layer 7, second reflective layer 9, adhesive layer 10

Disk 23: Substrate 1, heat diffusion layer 2, lower surface protect layer 4, recording film 5, upper surface protect layer 6, absorption control layer 7, adhesive layer 10

Disk 24: Substrate 1, protective layer 3, lower surface protect layer 4, recording film 5, upper surface protect layer 6, absorption control layer 7, first reflective layer 8, second reflective layer 9, adhesive layer 10

Disk 25: Substrate 1, protective layer 3, lower surface protect layer 4, recording film 5, upper surface protect layer 6, absorption control layer 7, first reflective layer 8, adhesive layer 10

Disk 26: Substrate 1, protective layer 3, lower surface protect layer 4, recording film 5, upper surface protect layer 6, absorption control layer 7, second reflective layer 9, adhesive layer 10

Disk 27: Substrate 1, protective layer 3, lower surface protect layer 4, recording film 5, upper surface protect layer 6, absorption control layer 7, adhesive layer 10

Disk 28: Substrate 1, protective layer 3, lower surface protect layer 4, recording film 5, absorption control layer 7, first reflective layer 8, second reflective layer 9, adhesive layer 10

Disk 29: Substrate 1, protective layer 3, lower surface protect layer 4, recording film 5, absorption control layer 7, first reflective layer 8, second reflective layer 9, adhesive layer 10

Disk 30: Substrate 1, protective layer 3, lower surface protect layer 4, recording film 5, absorption control layer 7, first reflective layer 8, adhesive layer 10

Disk 31: Substrate 1, protective layer 3, lower surface protect layer 4, recording film 5, absorption control layer 7, adhesive layer 10

Disk 32: Substrate 1, protective layer 3, recording film 5, upper surface protect layer 6, absorption control layer 7, first reflective layer 8, second reflective layer 9, adhesive layer 10

Disk 33: Substrate 1, protective layer 3, recording film 5, upper surface protect layer 6, absorption control layer 7, second reflective layer 9, adhesive layer 10

Disk 34: Substrate 1, protective layer 3, recording film 5, upper surface protect layer 6, absorption control layer 7, first reflective layer 8, adhesive layer 10

Disk 35: Substrate 1, protective layer 3, recording film 5, upper surface protect layer 6, absorption control layer 7, adhesive layer 10

Disk 36: Substrate 1, protective layer 3, recording film 5, absorption control layer 7, first reflective layer 8, second reflective layer 9, adhesive layer 10

Disk 37: Substrate 1, protective layer 3, recording film 5, absorption control layer 7, second reflective layer 9, adhesive layer 10

Disk 38: Substrate 1, protective layer 3, recording film 5, absorption control layer 7, first reflective layer 8, adhesive layer 10

Disk 39: Substrate 1, protective layer 3, recording film 5, absorption control layer 7, adhesive layer 10

(Thickness and Material of Each Layer)

The recording/reproduction characteristic is improved simply by employing a preferable range of the thickness and the material of each layer independently. By combining preferable ranges, however, the effect is further enhanced.

(2) Embodiment 2

(Configuration and Fabrication Method)

Figure 2:
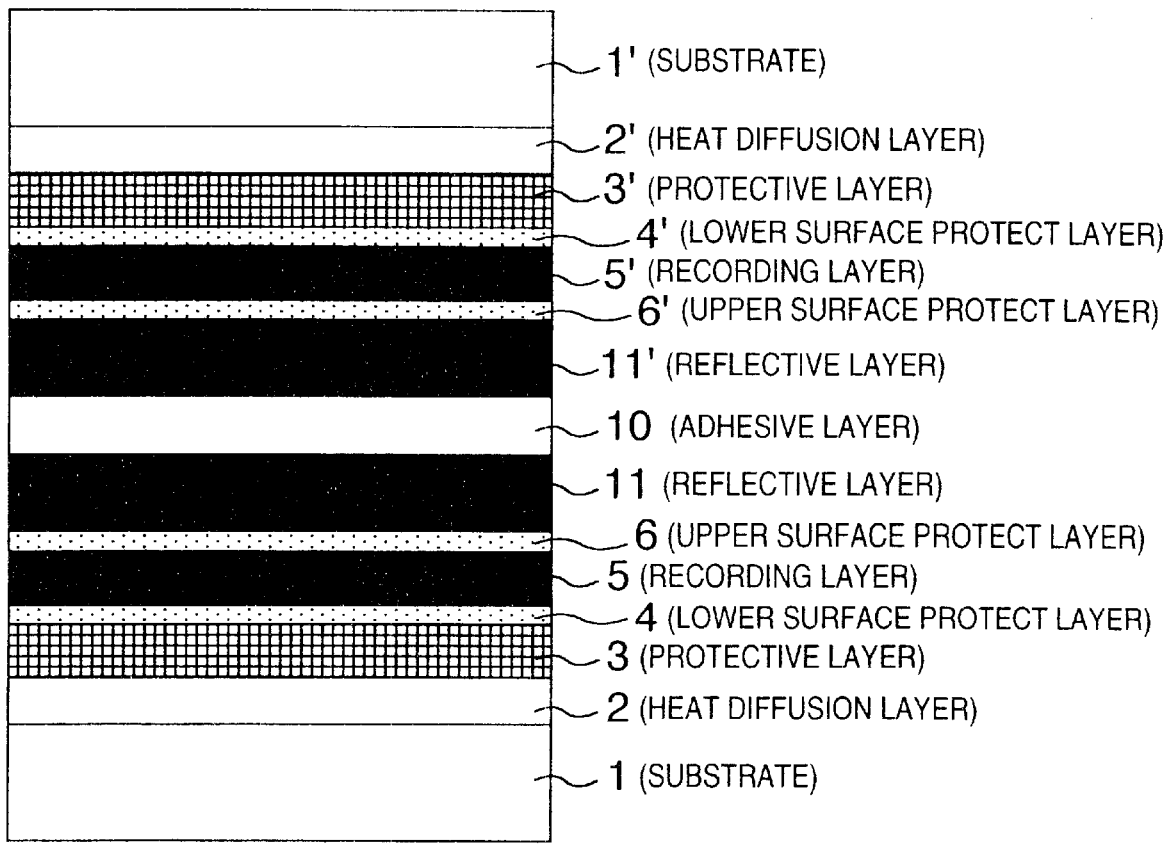
FIG. 2 is a sectional view showing an information recording medium having the current structure.

For clarifying the effects of the absorption control layer, a disk-type information recording medium of a structure lacking the absorption control layer was prepared. FIG. 2 is a sectional view showing the structure of this medium. This medium is fabricated in the following way.

First, a heat diffusion layer 2 of $Al_2O_3$ film about 30 nm thick was formed on a polycarbonate substrate 12 cm in diameter, 0.6 mm thick and having a tracking groove in the surface thereof. Then, a protective film 3 of ZnS about 45 nm thick, a lower surface protect layer 4 of $SiO_2$ film about 5 nm thick, a recording film 5 of $Ge_{14}Sb_{29}Te_{57}$ about 15 nm thick, an upper surface protect layer 6 of $SiO_2$ film about 15 nm thick and a reflective layer 11 of $Al_{98}Ti_2$ about 200 nm thick were sequentially formed, and two disk members prepared in similar manner are attached to each other thereby to produce a disk-type information recording medium shown in FIG. 2.

(Recording/reproduction Characteristic)

The initial crystallization, recording, erasure and reproduction are performed in the same manner as in embodiment 1. With an information recording medium having a configuration lacking an absorption control layer according to this embodiment, the overwrite operation, if performed when repeating the recording and reproduction, increases the jitter considerably as compared with the information recording medium as described in embodiment 1, as shown in FIG. 4.

This indicates that the absence of the absorption control layer increases the jitter after 10 overwrite cycles. This increased jitter probably stems from the fact that the absorption coefficient cannot be sufficiently controlled due to the absorption ratio (Ac/Aa) as small as about 0.9, thereby causing a remanence. The remanence is more liable to occur when the linear speed is high.

(3) Embodiment 3

Figure 5:
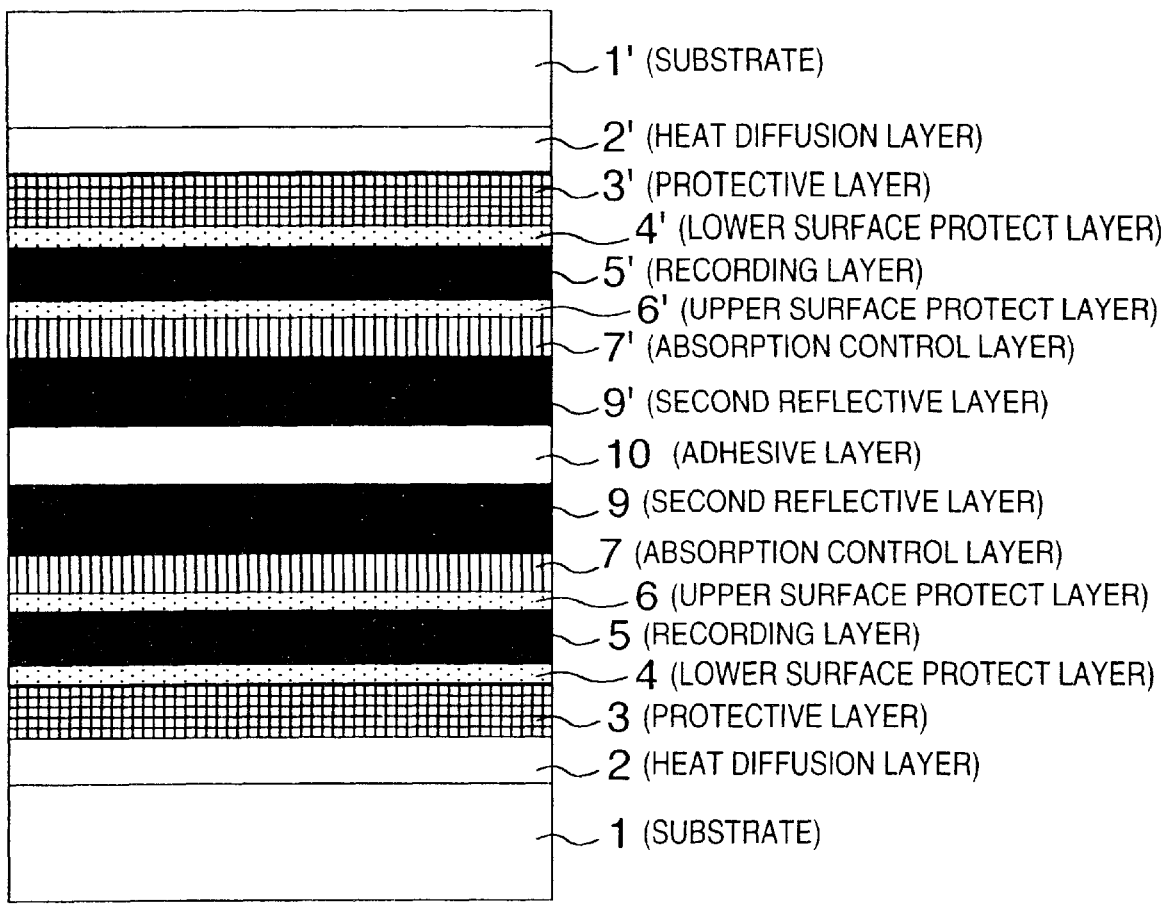
FIG. 5 is a sectional view showing a structure of an information recording medium according to embodiment 3 of the invention.

An information recording medium was prepared as follows in the same manner as in embodiment 1 except that the first reflective layer 8 of embodiment 1 is eliminated. Specifically, in the information recording medium according to embodiment 3, a heat diffusion layer 2 of $Al_2O_3$ film about 30 nm thick was formed on a polycarbonate substrate 1 having a diameter of 12 cm and a thickness of 0.6 mm with a tracking groove formed in the surface thereof. Then, a protective film of ZnS film about 45 nm thick, a lower surface protect layer 4 of $SiO_2$ film about 5 nm thick, a recording film 5 of $Ge_{14}Sb_{29}Te_{17}$ about 15 nm thick, an upper surface protect layer 6 of $SiO_2$ film about 15 nm thick, an absorption control layer 7 of $Mo_{80}(SiO_2)_{20}$ film about 18 nm thick, and a second reflective layer 9 of $Al_{98}Ti_2$ film about 180 nm thick, were sequentially formed. Two disk members prepared in a similar manner were attached to each other thereby to produce a disk-type information recording medium as shown in FIG. 5.

With the disk according to this embodiment, the first reflective layer is eliminated and therefore the time for preparing the disk could be shortened by the time corresponding to one layer as compared with the disk of embodiment 1.

(Recording/reproduction Characteristic)

The recording/reproduction characteristic was studied in the same manner as in embodiment 1. As a result, the same effect of the absorption control layer was obtained as in embodiment 1.

In addition, in view of the fact that the second reflective layer having a large heat conductivity is in direct contact with the absorption control layer, the heat is easily lost and the cross erase could be reduced. The cross erase is a phenomenon in which assuming that the recording is made in a track (T2) adjacent to a track (T1) where the mark is recorded, the signal amount is reduced due to the disappearance of the recording mark written in the track (T2) by the heat generated at the time of recording. On the other hand, the jitter at the front edge after 10 overwrite cycles increased by 3%.

The matter not described in this embodiment is similar to the corresponding matter in embodiment 1.

(4) Embodiment 4

With the exception that the composition of the recording films 5, 5' of embodiment 1 was changed in the following manner, an information recording medium having the following composition of the recording film was prepared in the same manner as in embodiment 1. The initial crystallization, recording, erasure and reproduction were carried out in the same manner as in embodiment 1.

(Composition of recording film)

The composition of the recording films 5, 5' used in this embodiment are changed along the lines connecting GeTe and $Sb_2Te_3$ in a triangular diagram, and the jitter (σ/Tw) was measured after ten overwrite cycles with the following result.

| Recording film composition | Jitter at front edge (%) | Jitter at trailing edge (%) |
|---|---|---|
| $Ge_8Sb_{34}Te_{58}$ | 23 | — |
| $Ge_{10}Sb_{32}Te_{58}$ | 18 | — |
| $Ge_{12}Sb_{27}Te_{56}$ | 15 | 14 |
| $Ge_{14}Sb_{29}Te_{57}$ | 14 | 14 |
| $Ge_{24}Sb_{21}Te_{55}$ | 14 | 15 |
| $Ge_{26}Sb_{19}Te_{55}$ | — | 18 |
| $Ge_{28}Sb_{17.5}Te_{54.5}$ | — | 22 |

This indicates that with the increase in Ge amount, the jitter at the front edge is reduced while the jitter at the trailing edge is increased. Thus, the Ge amount exhibiting a superior jitter characteristic is in the range of not less than 10 atomic % but not more than 26 atomic %, and a better characteristic is exhibited in the range of not less than 12 atomic % but not more than 24 atomic %.

Then, while maintaining a constant Te amount in the composition of the recording film and changing the Te and Sb amounts, the jitter (σ/Tw) after 10 overwrite cycles was measured with the following result.

| Recording film composition | Jitter at front edge (%) | Jitter at trailing edge (%) |
|---|---|---|
| $Ge_{27}Sb_{16}Te_{57}$ | — | 22 |
| $Ge_{25}Sb_{18}Te_{57}$ | — | 18 |
| $Ge_{23}Sb_{20}Te_{57}$ | 15 | 15 |
| $Ge_{14}Sb_{29}Te_{57}$ | 14 | 14 |
| $Ge_{12}Sb_{31}Te_{57}$ | 14 | 15 |
| $Ge_{10}Sb_{33}Te_{57}$ | 18 | — |
| $Ge_{8}Sb_{35}Te_{57}$ | 23 | — |

This indicates that with the increase in Sb amount, the jitter at the front edge is increased while the jitter at the trailing edge is reduced. Thus, the Sb amount exhibiting a superior jitter characteristic is in the range of not less than 18 atomic % but not more than 33 atomic %, and a better characteristic is exhibited in the range of not less than 20 atomic % but not more than 31 atomic %.

Then, while maintaining a constant Sb amount in the composition of the recording films 5, 5' and changing the Te and Ge amounts, the jitter ($\sigma$/Tw) after 10 overwrite cycles was measured with the following result.

| Recording film composition | Jitter at trailing edge (%) |
|---|---|
| $Ge_{9}Sb_{29}Te_{62}$ | 23 |
| $Ge_{11}Sb_{29}Te_{60}$ | 18 |
| $Ge_{13}Sb_{29}Te_{58}$ | 15 |
| $Ge_{14}Sb_{29}Te_{57}$ | 14 |
| $Ge_{17}Sb_{29}Te_{54}$ | 15 |
| $Ge_{19}Sb_{29}Te_{52}$ | 18 |
| $Ge_{20}Sb_{29}Te_{51}$ | 22 |

This indicates that the jitter at the trailing edge increases regardless of whether the Te amount is increased or decreased. Thus, the Te amount associated with a superior jitter characteristic is in the range of not less than 52 atomic % but not more than 60 atomic %, and a better jitter characteristic is exhibited in the range of not less than 54 atomic % but not more than 58 atomic %.

In this embodiment, by adding Ag to the recording film to form an Ag—Ge—Sb—Te recording film, it has been found that as compared with the Ge—Sb—Te, the number of a multiplicity of overwrite cycles at which the jitter at the front edge increases by 5% or more increases twice. In view of this, while maintaining constant Sb and Te amounts in the composition of the recording films 5, 5' and changing the Ge and Ag amounts, the jitter ($\sigma$/Tw) after 5 overwrite cycles was measured with the following result. Also, the number of overwrite cycles at which the jitter increases at least 5% was studied.

| Recording film composition | Jitter (%) | Number of rewrite operations |
|---|---|---|
| $Ge_{14}Sb_{29}Te_{57}$ | 14 | One time |
| $Ag_{1}Ge_{13}Sb_{29}Te_{57}$ | 14 | 1.5 times |
| $Ag_{2}Ge_{12}Sb_{29}Te_{57}$ | 15 | Twice |
| $Ag_{4}Ge_{10}Sb_{29}Te_{57}$ | 15 | Twice |
| $Ag_{6}Ge_{8}Sb_{29}Te_{57}$ | 20 | — |
| $Ag_{8}Ge_{6}Sb_{29}Te_{57}$ | 24 | — |

This indicates that addition of a small amount of Ag improves the number of possible overwrite cycles. With the increase in Ag amount, however, it has been found that the jitter also increases. Thus, the Ag amount associated with a superior jitter characteristic is in the range of not more than 6 atomic % and a better jitter characteristic is exhibited in the range of not more than 4 atomic %.

From the foregoing description, it is seen that in the case where the composition of the recording film is expressed as $Ge_{x-w}Sb_{y}Te_{z}M_{w}$ (x+y+z=1), a superior characteristic is exhibited in the range of $0.10 \leq x \leq 0.26$, $0.18 \leq y \leq 0.33$, $0.52 \leq z \leq 0.60$, $0 \leq w \leq 0.06$. A better characteristic is exhibited in the range of $0.12 \leq x \leq 0.24$, $0.20 \leq y \leq 0.31$, $0.54 \leq z \leq 0.58$, $0 \leq w \leq 0.04$.

Further, when the Ge amount reaches 20 atomic % or more in this range, the read light endurance is improved by 1.5 times. The read light endurance is determined by comparison with the power of the read light at which the recording signal is reduced by at least 2 dB during a five-minute reproduction. Also, in the case where the Ge amount is not more than 17 atomic % and the linear speed is high, the extinction ratio is large. Even with the linear speed of 12 m/s, the extinction ratio was as superior as not less than 30 dB.

Elements added to the recording film in place of Ag include Na, Mg, Al, P, S, Cl, L, Ca, Sc, Zn, Ga, As, Se, Br, Rb, Sr, Y, Zr, Nb, Ru, Rh, Cd, In, Sn, I, Cs, Ba, La, Hf, Ta, Re, Os, Ir, Hg, Tl, Pb, Th, U, Cr, W, Mo, Pt, Co, Ni, Pd, Si, Au, Cu, V, Mn, Fe, Ti and Bi. It has been found that even when Ag is replaced by at least one of these elements, the jitter is not easily increased after many overwrite cycles.

Among these elements, the addition of Ag increases the recording sensitivity by 10% as compared with Ge—Sb—Te, the addition of at least one of Cr, W and Mo at least triples the number of a multiplicity of overwrite cycles at which the jitter increases 5% or more, and the addition of at least one of Pt, Co and Pd increases the crystallization temperature by 50° C. or more as compared with Ge—Sb—Te.

Also, it has been found that when the impurities elements contained in the recording film exceeds 2 atomic % of the recording film components, the jitter at the front edge or the trailing edge after 10 overwrite cycles exceeds 15%. It has further been found that in the case where the impurities elements exceeds 5 atomic %, the jitter increases to at least 18%. Thus, a desirable content of the impurities elements in the recording film is not more than 5 atomic % of the recording film components at which the deterioration of the rewrite characteristic is not reduced so much. The content of not more than 2 atomic % is more desirable.

While changing the thickness of the recording films 5, 5' used in this embodiment, the jitter (a/Tw) after 10 overwrite cycles and 100 thousand overwrite cycles was measured and the following result was obtained. For each recording film thickness (nm), the value of jitter (%) at the front edge or the trailing edge, whichever is worse, is shown for the characteristic after 10 overwrite cycles, and the value of jitter (%) at the front edge is shown for the characteristic after 100 thousand overwrite cycles.

| Recording film thickness | Jitter after 10 rewrites | Jitter after $10^5$ rewrites |
|---|---|---|
| 8 | 23 | — |
| 10 | 20 | — |
| 13 | 15 | 15 |
| 18 | 14 | 15 |
| 20 | 15 | 15 |
| 30 | — | 20 |
| 40 | — | 25 |

This indicates that with the decrease in the thickness of the recording film, the jitter after ten overwrite cycles is increased due to the flow or segregation of the recording film, while with the increase in the thickness of the recording film, the jitter after 100 thousand overwrite cycles increases. It is thus seen that the desirable thickness of the recording film is in the range of not less than 10 nm but not more than 30 nm, or more desirably in the range of not less than 13 nm but not more than 20 nm.

Though somewhat time consuming for fabricating the recording film, it has been found that mixing nitrogen with the sputtering gas in the initial or last stage of the recording film fabrication, using a target containing a slight amount of nitrogen in the composition of the recording film or otherwise adding nitrogen in the neighborhood of the boundary between the recording film and other layers, the adhesive amount is increased for an improved characteristic.

The matters not described in this embodiment are similar to the corresponding matters in embodiments 1 and 3.

(5) Embodiment 5

(Configuration and Fabrication Method)

The following information recording medium was fabricated in a manner similar to embodiment 1 except that in this embodiment, the heat diffusion layer 2 is not included.

Figure 6:
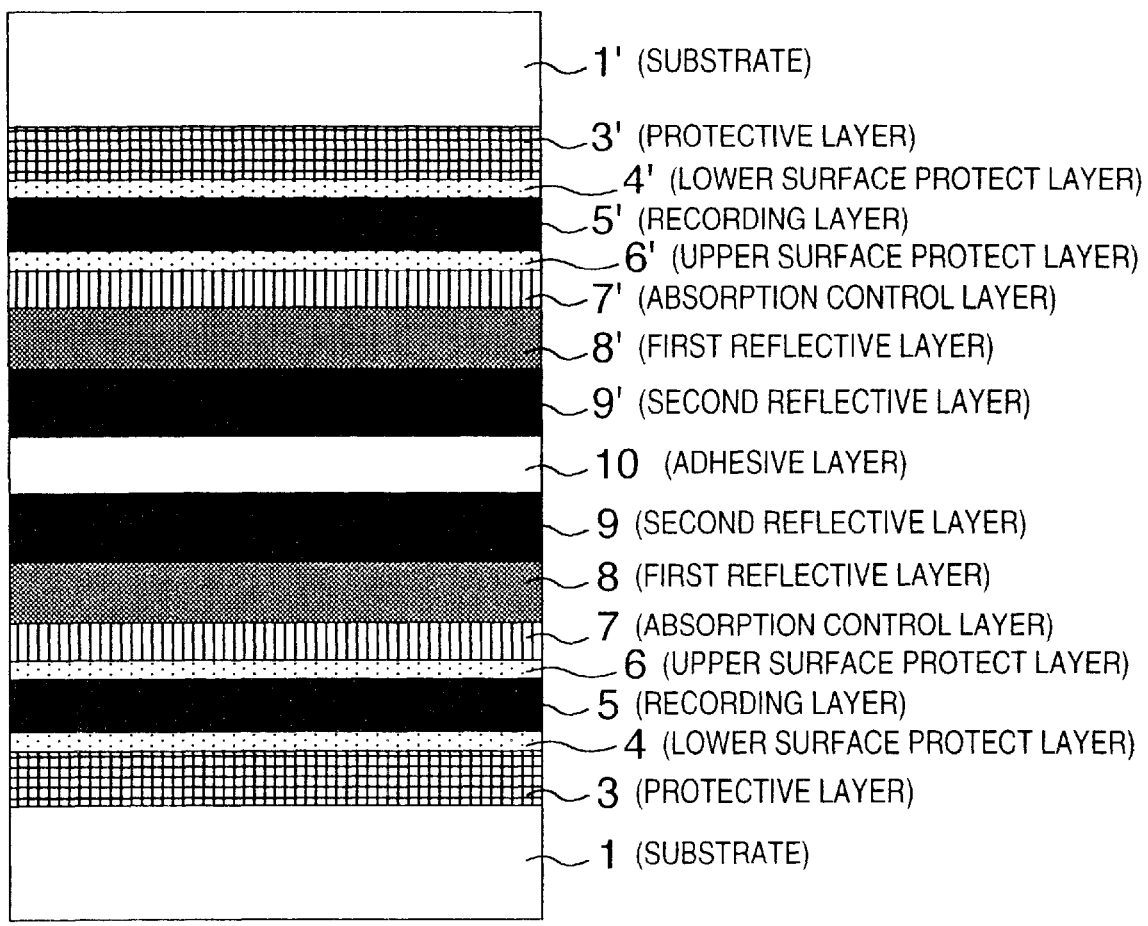
FIG. 6 is a sectional view showing a structure of an information recording medium according to embodiment 5 of the invention.

Specifically, a protective layer 3 of ZnS film about 45 nm thick, a lower surface protect layer 4 of $SiO_2$ film about 5 nm thick, a recording film 5 of $Ge_{14}Sb_{29}Te_{17}$ about 15 nm thick, an upper surface protect layer 6 of $SiO_2$ film about 15 nm thick, an absorption control layer 7 of $Mo_{80}(SiO_2)_{20}$ film about 18 nm thick, a first reflective layer 8 of $Al_{89}Ti_{11}$ film about 20 nm thick and a second reflective film 9 of $Al_{98}Ti_2$ about 180 nm were formed in that order sequentially. Two disk members fabricated in the same manner are attached to each other thereby to produce a disk-type information recording medium shown in FIG. 6.

Also, with the disk according to this embodiment, in which the heat diffusion layer is not included, the disk fabrication time could be shortened by a length equivalent to one layer as compared with the disk of embodiment 1. The heat diffusion layer takes a long time to form, and therefore the absence of the heat diffusion layer could reduce the total fabrication time by about one fourth.

(Recording/reproduction Characteristic)

The recording/reproduction characteristic was studied by the same method as in embodiment 1. As a result, the effect of the absorption control layer similar to that of embodiment 1 was obtained.

In addition, the temperature rise of the substrate which has been suppressed by the presence of the heat diffusion layer increases the jitter after 100 thousand overwrite cycles to 18% as compared with the case having the heat diffusion layer. Substantially no difference is observed for ten thousand or less overwrite cycles.

Those matters not described in this embodiment are similar to the corresponding matters in embodiments 1, 3 and 4.

(6) Embodiment 6

(Configuration and Fabrication Method)

An information recording medium was fabricated as follows in the same manner as in embodiment 1 except =that the first reflective layer 8 and the second reflective layer 9 were not included.

Figure 7:
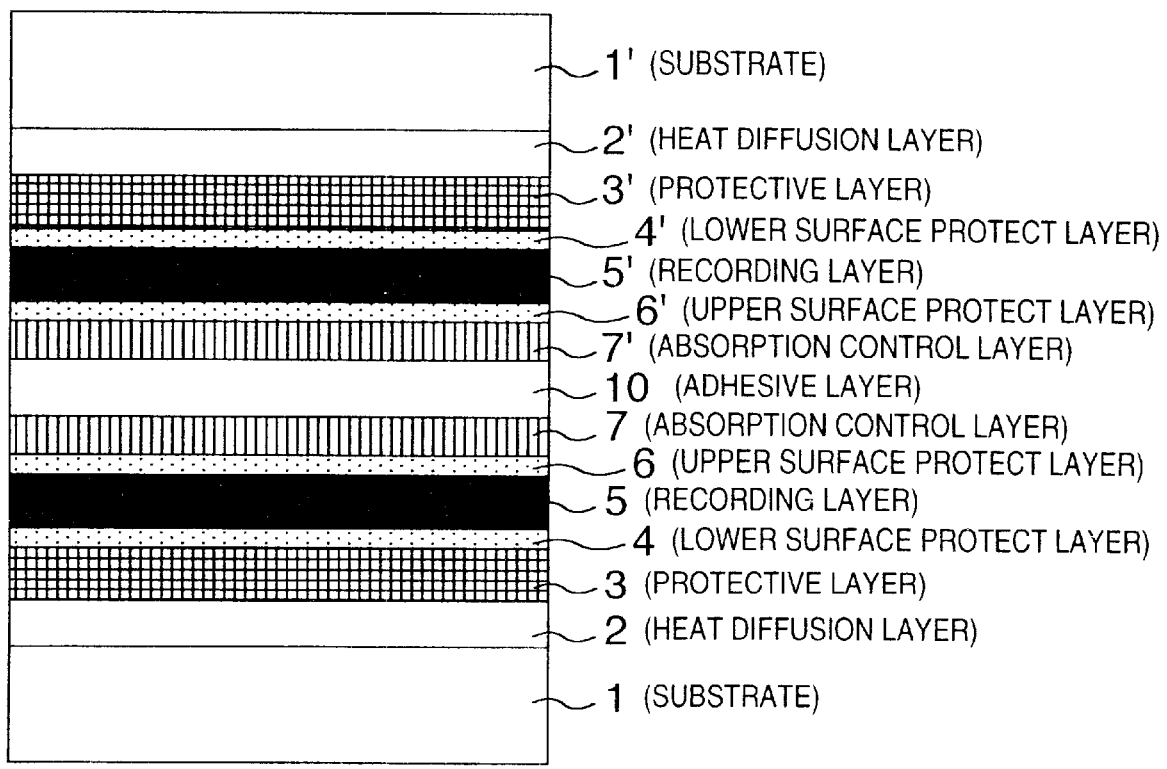
FIG. 7 is a sectional view showing a structure of an information recording medium according to embodiment 6 of the invention.

Specifically, in the information recording medium according to embodiment 6, a heat diffusion layer 2 of $Al_2O_3$ film, a protective layer 3 of ZnS film about 45 nm thick, a lower surface protect layer 4 of $SiO_2$ film about 5 nm thick, a recording film of $Ge_{14}Sb_{29}Te_{57}$ about 15 nm thick, an upper surface protect layer 6 of $SiO_2$ film about 15 nm thick and an absorption control layer 7 of $Mo_{80}(SiO_2)_{20}$ film about 18 nm thick, were formed sequentially in that order on a polycarbonate substrate 1 having a diameter of 12 cm and a thickness of 0.6 mm with the surface thereof formed with a tracking groove. Two disk members prepared in the same manner are attached to each other thereby to produce a disk-type information recording medium shown in FIG. 7.

Also, the absence of the heat diffusion layer in the disk according to this embodiment could reduce the disk fabrication time by a time corresponding to two layers as compared with the time required in embodiment 1. As a result, the total production time could be shortened considerably to about two thirds. (Recording/reproduction characteristic) The recording/reproduction characteristic was studied in the same manner as in embodiment 1, and it was found that as in embodiment 1, the jitter value can be reduced as compared with a disk structure having no absorption control layer.

(Thickness of Absorption Control Layer)

In the case where the reflective layer is lacking as in this embodiment, it has been found that the thickness of the absorption control layer not less than 50 nm is sufficient for maintaining a high strength. Also, the thickness of not more than 200 nm is desirable for shortening the fabrication time.

The matters not described with this embodiment are similar to the corresponding matters in embodiments 1 and 3 to 4.

As described above, according to the present invention, there is provided an information recording medium comprising an information recording thin film formed on a substrate as a recording layer for recording and/or reproducing the information by the change of atomic arrangement caused by radiation of light, and at least one protective layer, characterized in that the protective layer and the recording layer are formed in that order from the light incidence side, the medium further comprising at least one absorption control layer, whereby the jitter (σ/Tw) at the time of overwrite operation can be reduced as compared with the information recording medium lacking the absorption control layer. This is by reason of the fact that the remanence can be reduced due to the presence of the absorption control layer.

The absorption control layer is composed of a metal element or an unsaturated metal oxide and a dielectric material, and has the function of controlling the absorption coefficient Ac of the recording film in crystal state to not less than the absorption coefficient Aa of the recording medium in amorphous state.

Further, in the case where the thickness of the absorption control layer is set in the range of not less than 5 nm but not more than 50 nm, the jitter after 10 overwrite cycles can be reduced with an increased modulation degree.

The surface protect layer is formed in the boundary of the recording medium and has the effect of increasing the crystallization rate of the recording film and improving the extinction characteristic thereof. The protective layer is formed between the recording film and substrate, and has the effect of protecting the recording film. The heat diffusion layer, which is made of a material having a larger heat conductivity than the substrate and formed directly on the substrate, has the effect of preventing the temperature increase of the substrate at the time of a multiplicity of overwrite cycles thereby to reduce the increase in jitter. The first reflective layer has the effect of preventing the increase in jitter at the front edge, and the second reflective layer, due to its large heat conductivity, has the effect of reducing the increase in jitter after a multiplicity of overwrite cycles. Further, both the first reflective layer and the second reflective layer prevent the light from being transmitted through the medium and thus improve the recording sensitivity.

What is claimed is:

1. An information recording medium comprising:
   a substrate;
   a lower superficial layer formed on said substrate and having a thickness of not more than 25 nm;
   a recording layer formed on said lower superficial layer and on which information is recorded in accordance with a change of atomic arrangement caused by irradiation of light; and
   an absorption control layer formed on said recording layer.

2. An information recording medium according to claim 1, wherein said absorption control layer has a refraction index of not less than 1.2 and not more than 6 and an extinction of not less than 0.5 and not more than 3.3.

3. An information recording medium according to claim 1, wherein a thickness of said absorption control layer is in a range of not less than 10 nm and not more than 50 nm.

4. An information recording medium according to claim 1, wherein a heat diffusion layer is formed between said substrate and said lower superficial layer.

5. An information recording medium according to claim 1, wherein said lower superficial layer has a thickness of not less than 2 nm.

6. An information recording medium, comprising:
   a substrate;
   a recording layer formed on said substrate and on which information is recorded in accordance with a change of atomic arrangement caused by a radiation of light;
   an upper superficial layer formed on said recording layer and having a thickness of not more than 12 nm; and
   an absorption control layer formed on said upper superficial layer.

7. An information recording medium according to claim 6, wherein said absorption control layer has a refraction index of not less than 1.2 and not more than 6 and an extinction of not less than 0.5 and not more than 3.3.

8. An information recording medium according to claim 6, wherein a lower superficial layer is formed between said recording layer and said substrate.

9. An information recording medium according to claim 6, wherein a thickness of said lower superficial layer is in a range of not less than 2 nm and not more than 25 nm.

10. An information recording medium according to claim 6, wherein said upper superficial layer has a thickness of not less than 2 nm.

11. An information recording medium comprising a lower superficial layer, a recording layer and an absorption control layer formed on a substrate in order from a light incident side to the substrate, said recording layer enabling recording of information thereon by change of atomic arrangement caused by irradiation of light;
   wherein said lower superficial layer includes any one of materials including $SiO_2$, $Al_2O_3$ or a mixture of $Al_2O_3$ and $SiO_2$, $Ta_2O_5$, a mixture between $Ta_2O_5$ and $SiO_2$ or $Al_2O_3$, $ZrO_2$—$Y_2O_3$, a mixture of $ZrO_2$—$Y_2O_3$ with $SiO_2$, $Al_2O_3$ or $Ta_2O_{51}$ CoO, $Cr_2O_3$ and NiO.

12. An information recording medium according to claim 11, wherein said material has a purity of not less than 90%.

13. An information recording medium according to claim 11, wherein said absorption control layer is made of a material having a refraction index of not less than 0.2 and not more than 6 and an extinction coefficient of not less than 0.5 and not more than 3.3.

14. An information recording medium comprising a recording layer, an upper superficial layer and an absorption control layer formed on a substrate in order from a light incident side to the substrate, said recording layer enabling recording of information thereon by change of atomic arrangement caused by irradiation of light;
   wherein said upper superficial layer includes any one of materials including $SiO_2$, $Al_2O_3$ or a mixture of $Al_2O_3$ and $SiO_2$, $Ta_2O$,, a mixture between $Ta_2O_5$ and $SiO_2$ or $Al_2O_3$, $ZrO_2$—$Y_2O_3$, a mixture of $ZrO_2$—$Y_2O_3$ with $SiO_2$, $Al_2O_3$ or $Ta_2O_{51}$ CoO, $Cr_2O_3$ and NiO.

15. An information recording medium according to claim 14, wherein said material has a purity of not less than 90%.

16. An information recording medium according to claim 14, wherein said absorption control layer is made of a material having a refraction index of not less than 0.2 and not more than 6 and an extinction coefficient of not less 0.5 and not more than 3.3.

17. An information recording medium according to claim 14, wherein a lower superficial layer is formed between said recording layer and said substrate.

18. An information recording medium according to claim 14, wherein a lower superficial layer includes any one of materials including $SiO_2$, $Al_2O_3$ or a mixture of $Al_2O_3$ and $SiO_2$, $Ta_2O_5$, a mixture between $Ta_2O_5$ and $SiO_2$ or $Al_2O_3$, $ZrO_2$—$Y_2O_3$, a mixture of $ZrO_2$—$Y_2O_3$ with $SiO_2$, $Al_2O_3$ or $Ta_2O_5$, CoO, $Cr_2O_3$ and NiO.

19. An information recording medium comprising a substrate, a recording film formed on said substrate as a recording layer for recording information by change of atomic arrangement caused by irradiation of light, and an absorption control layer;
   wherein said medium comprises at least one of a lower superficial layer formed between said substrate and said lower recording film and an upper superficial layer formed between said recording film and said absorption control layer, said superficial layer or said upper superficial layer includes any one of materials including AlN, BN, CrN, $Cr_2N$, GeN, HfN, $Si_3N_4$, Al—Sn—N group material, Si—N group material, Si—O—N group material, TaN, TiN and ZrN, BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$, $WO_3$, and carbides including C, $Cr_3C_2$, $Cr_{23}C_6$, $Cr_7C_3$, $Fe_3C$, $MO_2C$, WC, $W_2C$, HfC, TaC and $CaC_2$.

20. An information recording medium according to claim 19, wherein said material has a purity of not less than 90%.

* * * * *

UNITED STATES PATENT AND TRADEMARK OFFICE
CERTIFICATE OF CORRECTION

PATENT NO.   : 6,436,504 B2
DATED        : August 20, 2002
INVENTOR(S)  : Miyamoto et al.

It is certified that error appears in the above-identified patent and that said Letters Patent is hereby corrected as shown below:

<u>Title page,</u>
Item [63], should read: -- Continuation of application No. 09/380,302, filed as application No. PCT/JP98/04019 on Sept. 8, 1998, now U.S. Patent No. 6,231,945 --

Signed and Sealed this

Eighteenth Day of February, 2003

JAMES E. ROGAN
*Director of the United States Patent and Trademark Office*